United States Patent
Sugiyama

(10) Patent No.: US 12,422,653 B2
(45) Date of Patent: Sep. 23, 2025

(54) LENS APPARATUS AND IMAGE PICKUP APPARATUS

(71) Applicant: CANON KABUSHIKI KAISHA, Tokyo (JP)

(72) Inventor: Kei Sugiyama, Tochigi (JP)

(73) Assignee: CANON KABUSHIKI KAISHA, Tokyo (JP)

(*) Notice: Subject to any disclaimer, the term of this patent is extended or adjusted under 35 U.S.C. 154(b) by 403 days.

(21) Appl. No.: 17/985,981

(22) Filed: Nov. 14, 2022

(65) Prior Publication Data
US 2023/0152559 A1 May 18, 2023

(30) Foreign Application Priority Data
Nov. 18, 2021 (JP) .................. 2021-187560

(51) Int. Cl.
| | | |
|---|---|---|
| G02B 15/14 | (2006.01) | |
| G02B 13/00 | (2006.01) | |
| G02B 15/15 | (2006.01) | |
| G02B 15/16 | (2006.01) | |
| G02B 27/64 | (2006.01) | |
| G02B 30/26 | (2020.01) | |
| H04N 23/55 | (2023.01) | |

(52) U.S. Cl.
CPC . *G02B 15/143105* (2019.08); *G02B 13/0065* (2013.01); *G02B 13/009* (2013.01); *G02B 15/144113* (2019.08); *G02B 15/15* (2013.01); *G02B 15/16* (2013.01); *G02B 30/26* (2020.01); *H04N 23/55* (2023.01); *G02B 27/646* (2013.01)

(58) Field of Classification Search
CPC ........ G03B 35/08; G03B 35/10; G03B 35/12; G02B 15/143105; G02B 15/144113; G02B 13/0065; G02B 13/009; G02B 15/173; G02B 15/163; G02B 15/145; G02B 15/1461; G02B 15/16; G02B 15/15
See application file for complete search history.

(56) References Cited

U.S. PATENT DOCUMENTS 2,716,920 A * 9/1955 Henri .................. G03B 35/10
396/326
3,980,394 A * 9/1976 Zapf .................. G02B 23/18
359/473

(Continued)

FOREIGN PATENT DOCUMENTS

| CN | 108693634 A * | 10/2018 | ............. G02B 15/14 |
|---|---|---|---|
| JP | H11-258518 A | 9/1999 | |
| JP | 2020-8629 A | 1/2020 | |

*Primary Examiner* — Bumsuk Won
*Assistant Examiner* — Alex Park Rickel
(74) *Attorney, Agent, or Firm* — Carter, DeLuca & Farrell LLP

(57) ABSTRACT

A lens apparatus includes two optical systems. Each of the two optical systems includes, in order from an object side to an image side, a first lens unit having positive refractive power, a second lens unit having negative refractive power, a first reflective surface, a second reflective surface, and a rear lens unit having positive refractive power. At least a distance between the first lens unit and the second lens unit and a distance between the second lens unit and the first reflective surface are changed during magnification variation. A predetermined condition is satisfied.

23 Claims, 11 Drawing Sheets

(56) References Cited

U.S. PATENT DOCUMENTS

| | | | |
|---|---|---|---|
| 2006/0077545 A1* | 4/2006 | Cobb | H04N 13/327 |
| | | | 359/464 |
| 2008/0137218 A1* | 6/2008 | Omichi | G02B 15/145113 |
| | | | 359/764 |
| 2011/0279655 A1* | 11/2011 | Tan | H04N 13/218 |
| | | | 348/E13.074 |
| 2013/0278731 A1* | 10/2013 | Inomoto | G03B 35/10 |
| | | | 359/462 |
| 2016/0120397 A1* | 5/2016 | Namii | G03B 17/17 |
| | | | 348/68 |
| 2016/0253559 A1* | 9/2016 | Goncharov | G06V 40/19 |
| | | | 348/78 |
| 2020/0014908 A1* | 1/2020 | Ebe | G02B 9/12 |

\* cited by examiner

LENS APPARATUS AND IMAGE PICKUP APPARATUS

BACKGROUND

Technical Field

The disclosure relates to lens apparatuses and image pickup apparatuses.

Description of the Related Art

An image pickup apparatus that captures a stereoscopic image (video) is demanded in order to capture the video for content that provides a sense of reality, such as virtual reality. Japanese Patent Laid-Open No. ("JP") 2020-8629 discloses a lens apparatus that can increase a baseline length with a compact configuration by forming optical images on a single image sensor by bending an optical path of each of two optical systems. JP 11-258518 discloses an observation optical system for magnification variation (zooming) by making variable an air gap in an objective lens.

In stereoscopic viewing with the lens apparatus disclosed in JP 2020-8629, a stereoscopic effect decreases for a distant object. In order to capture a stereoscopic image (video) having a natural stereoscopic effect for objects at various object distances, including the distant object, it is necessary to use a more telephoto magnification-varying optical system. The observation optical system disclosed in JP 11-258518 is not supposed to form two optical images on a single image sensor, and has difficulty in miniaturization while avoiding physical interference between optical elements.

SUMMARY

The disclosure provides a lens apparatus and an image pickup apparatus, each of which has a compact configuration and a long baseline length, and can acquire a stereoscopic image with a natural stereoscopic effect for a distant object.

A lens apparatus according to one aspect of the disclosure includes two optical systems. Each of the two optical systems includes, in order from an object side to an image side, a first lens unit having positive refractive power, a second lens unit having negative refractive power, a first reflective surface, a second reflective surface, and a rear lens unit having positive refractive power. At least a distance between the first lens unit and the second lens unit and a distance between the second lens unit and the first reflective surface are changed during magnification variation. The following inequality is satisfied:

$$0.05 < Dout/Din < 0.50$$

where Din is a distance between surface vertices of lenses disposed closest to the object side in each of the two optical systems, and Dout is a distance between surface vertices of lenses disposed closest to the image side in each of the two optical systems. An image pickup apparatus having the above lens apparatus also constitutes another aspect of the disclosure.

Further features of the disclosure will become apparent from the following description of exemplary embodiments with reference to the attached drawings.

DESCRIPTION OF THE EMBODIMENTS

Referring now to the accompanying drawings, a detailed description will be given of embodiments according to the disclosure.

Figure 1:
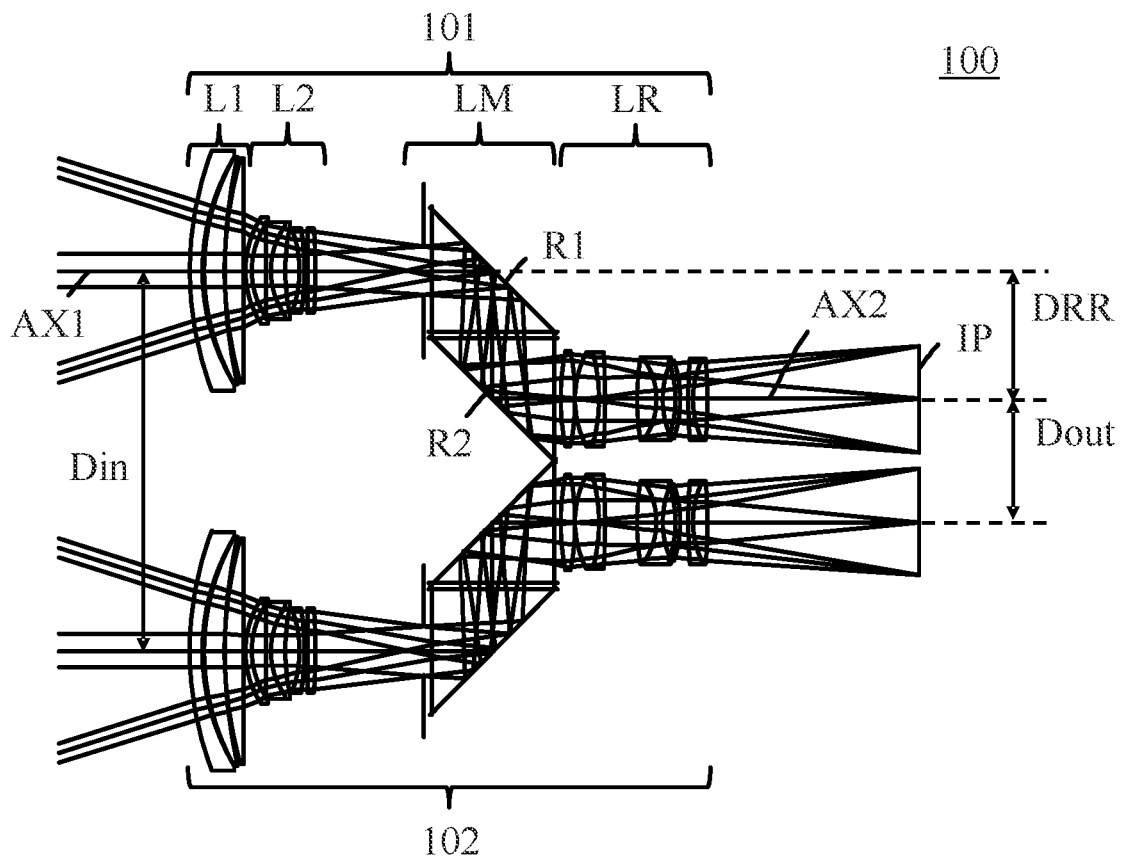
FIG. 1 is a sectional view of principal part of a lens apparatus according to Example 1.

Referring now to FIG. 1, a description will be given of an imaging optical system (lens apparatus) according to Example 1. FIG. 1 is a sectional view of principal part of an imaging optical system (lens apparatus) 100 according to this example. The imaging optical system 100 includes two optical systems 101 and 102. The optical systems 101 and 102 are held by an unillustrated housing. Since the optical systems 101 and 102 are the same except for a reflecting direction of each reflecting member, which will be described below, the optical system 101 will be described as a representative in the following description. Hereinafter, in a case where the optical systems 101 and 102 are said to be the same, it means that the lens configurations and the like are the same except for the reflecting direction of each reflecting member.

The optical system 101 includes an intermediate unit LM that bends an optical path. The intermediate unit LM includes a first reflective surface R1 and a second reflective surface R2. In this example, the intermediate unit LM has no refractive power. In this example, an optical axis AX1 on an object side of the first reflective surface R1 and an optical axis AX2 on an image side of the second reflective surface R2 are parallel to each other, but the optical axis AX1 may be slightly internally rotated. The term "parallel" is not limited to a strictly parallel state, but includes a state that shifts from the parallel state by about ±5° (approximately parallel state).

In FIG. 1, IP denotes an image plane (paraxial imaging position). An image sensor such as a CCD sensor or a CMOS sensor or a film is disposed on the image plane IP. An image (optical image) is formed on the image plane IP by each of the optical systems 101 and 102. That is, two optical images are formed on a single image sensor by the two optical systems 101 and 102 in the imaging optical system 100.

Figure 2:
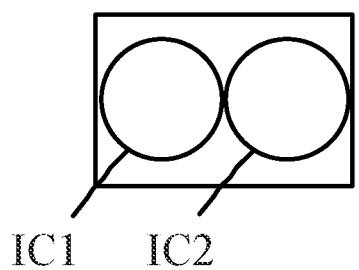
FIG. 2 is a schematic diagram of an image circle according to Example 1.

Referring now to FIG. 2, a description will be given of two image circles (areas where optical images are formed, that is, effective image circle diameters) IC1 and IC2 formed on the image plane IP according to this example. FIG. 2 is a schematic diagram of the image circles IC1 and IC2. The image circle IC1 is an image circle formed by the optical system 101, and the image circle IC2 is an image circle formed by the optical system 102. Hence, in this example, two images having a parallax can be acquired by the single image sensor.

Figure 3:
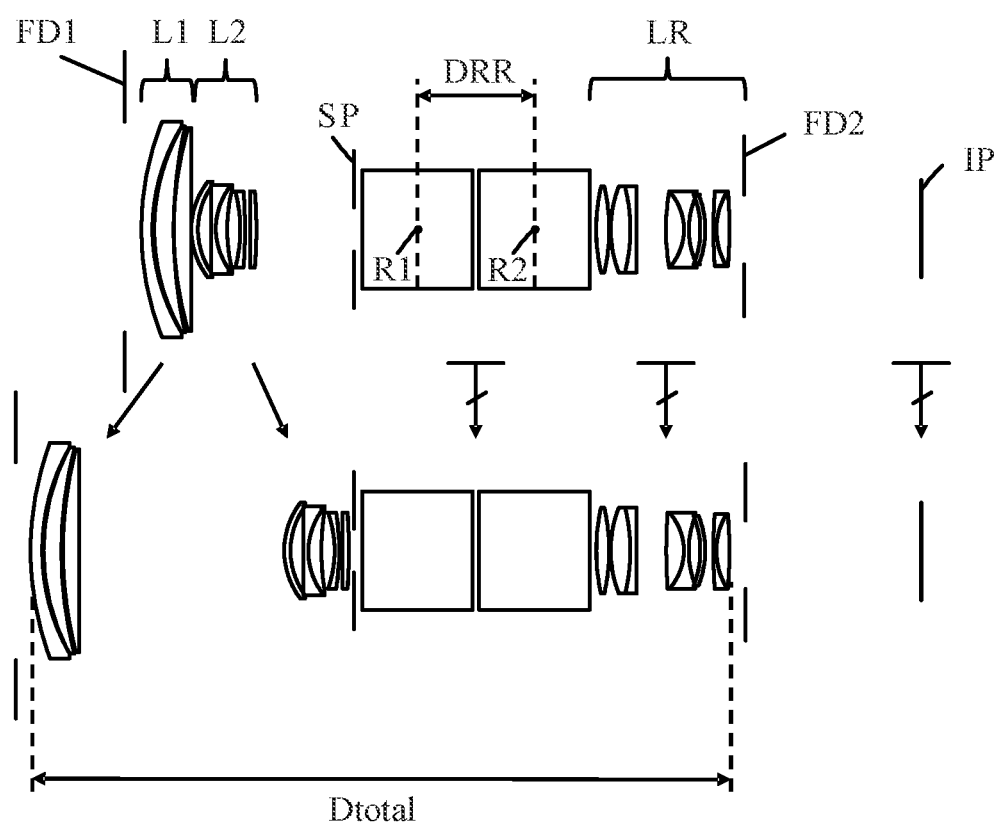
FIG. 3 is a sectional view of the optical system according to Example 1.

Referring now to FIG. 3, a description will be given of the optical system 101 according to this example. FIG. 3 is a sectional view of the optical system 101 according to this example. FIG. 3 illustrates the developed optical path bent by the first reflective surface R1 and the second reflective surface R2. The optical system 101 includes, in order from the object side to the image side, a first lens unit L1, a second lens unit L2, a first reflective surface R1, a second reflective surface R2, and a rear lens unit LR. During magnification variation, at least a distance between the first lens unit L1 and the second lens unit L2 and a distance between the second lens unit L2 and the first reflective surface R1 vary.

The first lens unit L1 has positive refractive power. In this example, the first lens unit L1 is moved during magnification variation but may not be moved as in the following example. The second lens unit L2 has negative refractive power and is moved during magnification variation. In this example, the first reflective surface R1 is disposed at a position adjacent to the second lens unit L2. However, as will be described below, a lens unit having positive refractive power and an aperture stop (diaphragm) may be provided between the second lens unit L2 and the first reflective surface R1. The rear lens unit LR has positive refractive power. The first reflective surface R1 and the second reflective surface R2 are disposed close to each other, and may be housed inside the same undivided barrel (integrated barrel).

In order to capture a stereoscopic image with a single image sensor, the image circles IC1 and IC2 of the optical systems 101 and 102 must be separated. In order to separate the image circles IC1 and IC2 at a desired angle of view, a field stop FD1 may be provided on the object side of the first lens unit L1. Alternatively, a field stop FD2 may be provided on the image side of the rear lens unit LR. That is, a field stop may be provided on at least one of a position closest to the object and a position closest to the image plane in the optical system 101.

Figure 4A:
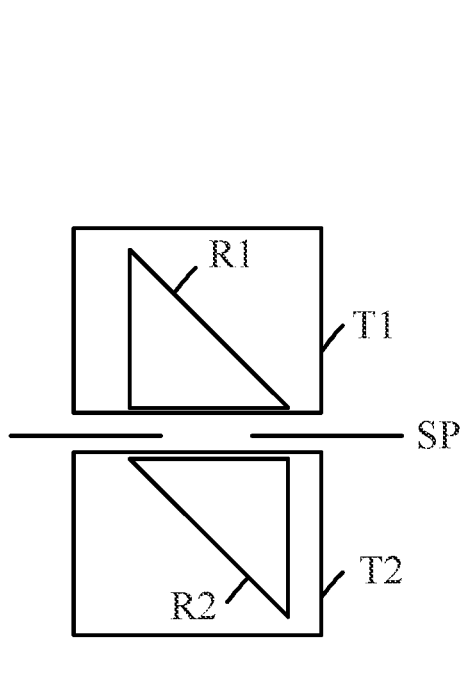
FIGS. 4A and 4B are schematic diagrams of barrels according to Example 1.
Figure 4B:
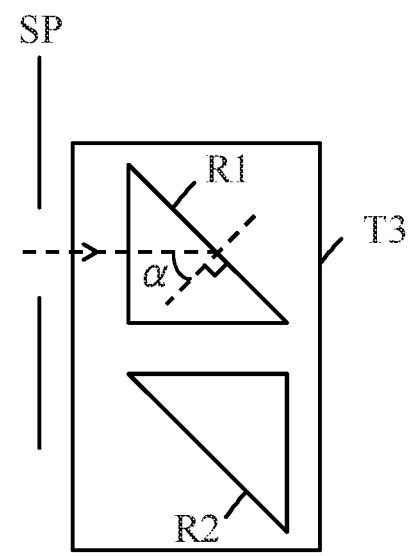

Referring now to FIGS. 4A and 4B, a description will be given of barrels according to this example. FIGS. 4A and 4B are schematic diagrams of the barrels, FIG. 4A illustrates a divided barrel between the two reflective surfaces by the aperture stop unit, and FIG. 4B illustrates an integrated barrel between the two reflective surfaces. FIG. 4A corresponds to the configuration disclosed in JP 2020-8629, and FIG. 4B corresponds to this example. In JP 2020-8629, since an aperture stop is inserted between the two reflective surfaces R1 and R2 that bend the optical path, each reflective surface must be housed in a separate barrel. This is because the aperture stop unit generally has a diameter larger than that of the housing that holds the lens. Therefore, the configuration disclosed in JP 2020-8629 may cause a relative optical axis shift between the divided barrels, results in imaging displacement and rotation of the optical image, and deteriorates image quality.

On the other hand, this example has a purpose to make the configuration more telephoto than the configuration of JP 2020-8629 and the barrel displacement is more influential accordingly. Thus, this example provides no aperture stop between the two reflective surfaces and houses the two reflective surfaces in a single barrel. That is, this example holds the first reflective surface R1 and the second reflective surface R2 by the integrated barrel. This configuration can reduce relative displacement between the two reflective surfaces and improve the image quality. In this example, each of the first reflective surface R1 and the second reflective surface R2 is formed on a slope of a rectangular prism, but they may be formed on a set of two parallel surfaces of an integrated optical element, such as a simple plane mirror and a prism, as described below.

The first reflective surface R1 and the second reflective surface R2 may be inserted in a space and arranged between the second lens unit L2 and the rear lens unit LR as in this example. This is because in a case where the reflective surface is disposed closer to the object side than the second lens unit L2, the diameters of the first lens unit L1 and the first reflective surface R1 become larger, and the imaging optical system 100 becomes larger. In order to dispose the reflective surface on the image side of the rear lens unit LR, it is necessary to secure a proper back focus and, in a case where the refractive power of the rear lens unit LR is relaxed for this purpose, the diameter of the lens of the rear lens unit LR becomes larger and the optical systems 101 and 102 interfere with each other.

The optical system 101 according to this example satisfies the following inequality due to bending of the optical path by the first reflective surface R1 and the second reflective surface R2. This is similarly applied to an optical system according to each example described below.

$$0.05 < Dout/Din < 0.50 \tag{1}$$

where Din is a distance between surface vertices of lenses closest to the object in the two optical systems 101 and 102, and Dout is a distance between surface vertices of lenses closest to the image plane in the two optical systems 101 and 102. The distance Din is called a baseline length and affects the stereoscopic effect of a stereoscopic image.

Inequality (1) defines a ratio between the distance Din between the object-side lens surfaces of the two optical systems 101 and 102 and the distance Dout between the image-side lens surfaces. Satisfying inequality (1) can make the entire apparatus compact while ensuring a sufficient baseline length for stereoscopic viewing. In a case where the value is lower than the lower limit of inequality (1), the lenses of the two optical systems 101 and 102 on the image sides of the second reflective surfaces R2 physically interfere with each other. Alternatively, the baseline length becomes too long and the parallax becomes excessive. In this case, the stereoscopic image becomes unsuitable for human viewing. On the other hand, in a case where the value is higher than the upper limit of inequality (1), the baseline length becomes too small and the parallax is small. In this case, it is difficult for a person to obtain a stereoscopic effect and thus this configuration is unsuitable for the purpose of imaging a stereoscopic video. The above configuration according to this example can provide a compact magnification-varying imaging optical system (lens apparatus) with a long baseline length and high image quality.

The numerical range of inequality (1) may be set to that of inequality (1a) or (1b) below for stereoscopic imaging with a more natural stereoscopic effect for human vision.

$$0.07 < Dout/Din < 0.47 \tag{1a}$$

$$0.13 < Dout/Din < 0.42 \tag{1b}$$

A description will now be given of a configuration that the imaging optical system 100 according to this example may satisfy. At least one of the two optical systems 101 and 102 may satisfy the configuration described below. The two optical systems 101 and 102 may have the same configuration, and thus both of the two optical systems 101 and 102 may satisfy the configurations described below.

In this example, an aperture stop SP is disposed between the second lens unit L2 and the first reflective surface R1. In a case where the aperture stop SP is disposed on the object side of the second lens unit L2, an off-axis light beam in the rear lens unit LR becomes high, and the diameter of the lens here becomes large and it becomes difficult to avoid physical interference between the two optical systems 101 and 102. In a case where the aperture stop SP is disposed on the image side of the second reflective surface R2, the diameter of the lens of the rear lens unit LR itself can be made small, but it becomes difficult to avoid physical interference between the aperture stop units in the two optical systems 101 and 102. In addition, as described above, in a case where the aperture stop SP is disposed between the first reflective surface R1 and the second reflective surface R2, the relative displacement (positional shift) of the reflective surfaces causes the image quality to deteriorate. Therefore, the aperture stop SP may be disposed between the second lens unit L2 and the first reflective surface R1.

The first lens unit L1 may include a single negative meniscus lens having a convex surface facing the object side and two positive lenses. Distortion and astigmatism can be suppressed by sharing the positive refractive power of the first lens unit L1 between two or more positive lenses. One or more negative lenses can satisfactorily correct chromatic aberration. The second lens unit L2 may include two negative lenses and one positive lens, and may include three negative lenses. Distortion and astigmatism can be suppressed by sharing the negative refractive power between two or more negative lenses. The positive lens can suppress chromatic aberration.

The rear lens unit LR may not be moved during magnification variation. On the image side of the second reflective surface R2, there is a problem of avoiding physical interference between the two optical systems 101 and 102 disposed in parallel. In a case where the rear lens unit LR is movable, a barrel for moving the rear lens unit LR is necessary in the barrel housing the optical system 101. Such a multi-structured barrel has further difficulty in avoiding interference between the two optical systems 101 and 102. Therefore, the rear lens unit LR may not be moved during magnification variation.

The optical system 101 according to this example may satisfy the following inequalities. This is similarly applicable to an optical system according to each example described below.

$$-1.60 < f12w/fw < -0.50 \quad (2)$$

$$0.25 < DRR/Din < 0.49 \quad (3)$$

$$0.50 < f1/fw < 5.00 \quad (4)$$

$$-2.00 < f2/fw < -0.10 \quad (5)$$

$$0.50 < fR/fw < 5.00 \quad (6)$$

$$1.00 < Dout/\Phi out < 3.00 \quad (7)$$

Here, f12w is a combined focal length for the d-line (wavelength 587.6 nm) at the wide-angle ends of the first lens unit L1 and the second lens unit L2. Hereinafter, unless otherwise specified, all focal lengths are based on the d-line. fw is a focal length at the wide-angle end of the entire optical system 101. DRR is a distance along the optical axis between the first reflective surface R1 and the second reflective surface R2. f1 is a focal length of the first lens unit L1. f2 is a focal length of the second lens unit L2. fR is a focal length of the rear lens unit LR. $\Phi$out is an effective diameter of a lens closest to the image plane in the optical system 101. The effective diameter $\Phi$out is a diameter through which an effective light ray that contributes to imaging passes through that lens.

Inequality (2) defines a range regarding a relationship between the focal lengths of the first lens unit L1 and the second lens unit L2. In a case where the value is lower than the lower limit of inequality (2), the refractive power of the first lens unit L1 becomes too small, and the front lens diameter becomes large. On the other hand, in a case where the value is higher than the upper limit of inequality (2), the refractive powers of the first lens unit L1 and the second lens unit L2 become too strong and lateral chromatic aberration and astigmatism become significant. The numerical range of inequality (2) may be set to a range of inequality (2a) or (2b) below in order to achieve both the miniaturization and aberration correction in a well-balanced manner.

$$-1.55 < f12w/fw < -0.60 \quad (2a)$$

$$-1.51 < f12w/fw < -0.77 \quad (2b)$$

Inequality (3) defines a range regarding a relationship between the distance between the first reflective surface R1 and the second reflective surface R2 and the distance Din between the surface vertices of the lenses disposed closest to the object. In a case where the value is lower than the lower limit value of inequality (3), the baseline length becomes insufficient to provide a sufficient stereoscopic effect. On the other hand, in a case where the value is higher than the upper limit of inequality (3), the distance DRR between the two reflective surfaces becomes too long, and accordingly off-axis light beams pass through the outside of the lens in the rear lens unit LR. Therefore, the diameter of the lens in the rear lens unit LR becomes large, and it becomes difficult to arrange the two optical systems 101 and 102 in parallel.

The numerical range of inequality (3) may be set to that of inequality (3a) or (3b) below in order to achieve a better balance between the miniaturization and the stereoscopic effect.

$$0.26 < DRR/Din < 0.48 \quad (3a)$$

$$0.28 < DRR/Din < 0.47 \quad (3b)$$

Inequality (4) defines a range regarding the focal length of the first lens unit L1. In a case where the value is lower than the lower limit of inequality (4), the refractive power of the first lens unit L1 becomes too strong and lateral chromatic aberration and astigmatism become significant. On the other hand, in a case where the value is higher than the upper limit of inequality (4), the refractive power of the first lens unit L1 becomes too weak, the overall optical length becomes long, and it becomes difficult to reduce the size of the optical system. The numerical range of inequality (4) may be set to that of inequality (4a) or (4b) below in order to achieve both the aberration correction and miniaturization in a well-balanced manner.

$$0.80 < f1/fw < 4.50 \quad (4a)$$

$$1.22 < f1/fw < 3.57 \quad (4b)$$

Inequality (5) defines a range regarding the focal length of the second lens unit L2. In a case where the value is lower than the lower limit of inequality (5), the refractive power of the second lens unit L2 becomes too strong and lateral chromatic aberration and astigmatism become significant. On the other hand, in a case where the value is higher than the upper limit of inequality (5), the refractive power of the second lens unit L2 becomes too weak, and the overall optical length becomes long, making it difficult to reduce the size of the optical system. The numerical range of inequality (5) may be set to that of inequality (5a) or (5b) below in order to achieve both the aberration correction and miniaturization in a well-balanced manner.

$$-1.50 < f2/fw < -0.20 \quad (5a)$$

$$-0.95 < f2/fw < -0.39 \quad (5b)$$

Inequality (6) defines a range regarding the focal length of the rear lens unit LR. In a case where the value is lower than the lower limit of inequality (6), the refractive power of the rear lens unit LR becomes too strong, lateral chromatic aberration and astigmatism become significant, and a proper back focus cannot be secured. On the other hand, in a case where the value is higher than the upper limit of inequality (6), the refractive power of the rear lens unit LR becomes too weak, the overall optical length becomes long, and it becomes difficult to reduce the size of the optical system. The numerical range of inequality (6) may be set to that of inequality (6a) or (6b) below in order to achieve both the aberration correction and miniaturization in a well-balanced manner.

$$0.75 < fR/fw < 3.50 \quad (6a)$$

$$1.03 < fR/fw < 2.23 \quad (6b)$$

Inequality (7) defines a range regarding a relationship between the distance Dout between the surface vertices of the lenses closest to the image plane and the diameter of the lens closest to the image plane. In a case where the value is lower than the lower limit of inequality (7), the lenses in the rear lens units of the optical systems 101 and 102 physically interfere with each other. On the other hand, in a case where the value is higher than the upper limit of inequality (7), the diameter of the lens in the rear lens unit LR becomes too small, a light amount decreases, and high image quality cannot be obtained. The numerical range of inequality (7) may be set to that of inequality (7a) or (7b) below in order to achieve the physical interference and the maximization of the light amount in a well-balanced manner.

$$1.05 < Dout/\Phi out < 2.40 \quad (7a)$$

$$1.10 < Dout/\Phi out < 1.63 \quad (7b)$$

Figure 5A:
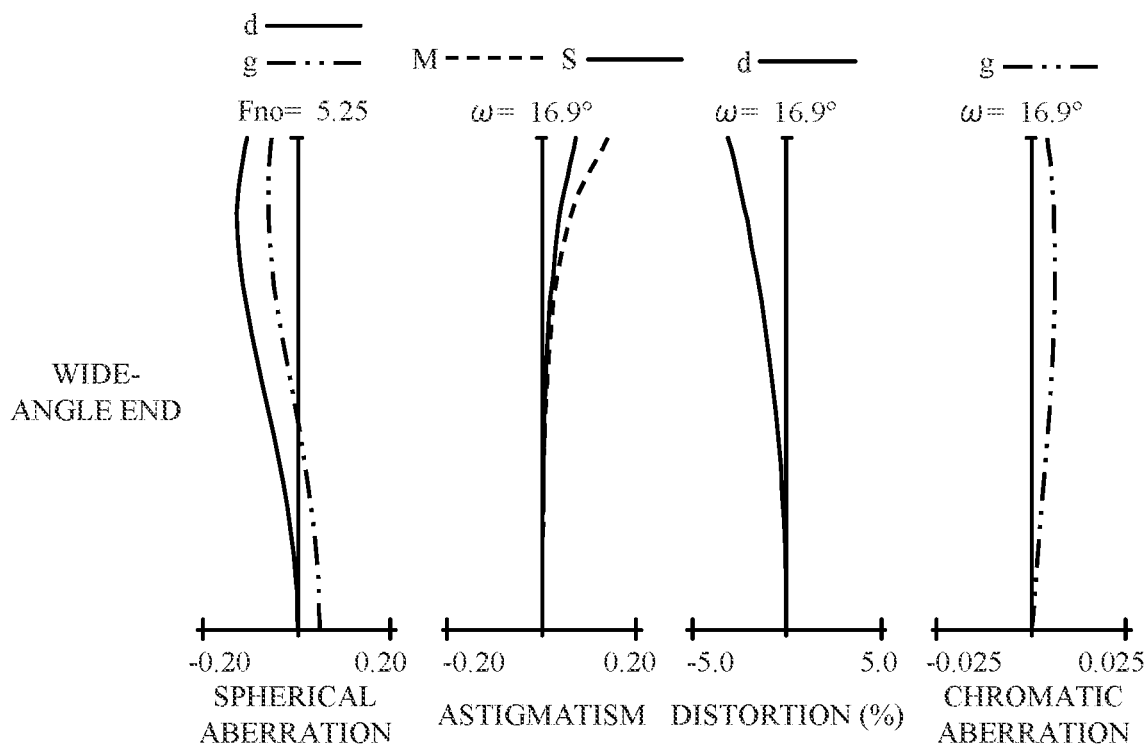
FIGS. 5A and 5B are aberration diagrams of the optical system according to Example 1.
Figure 5B:
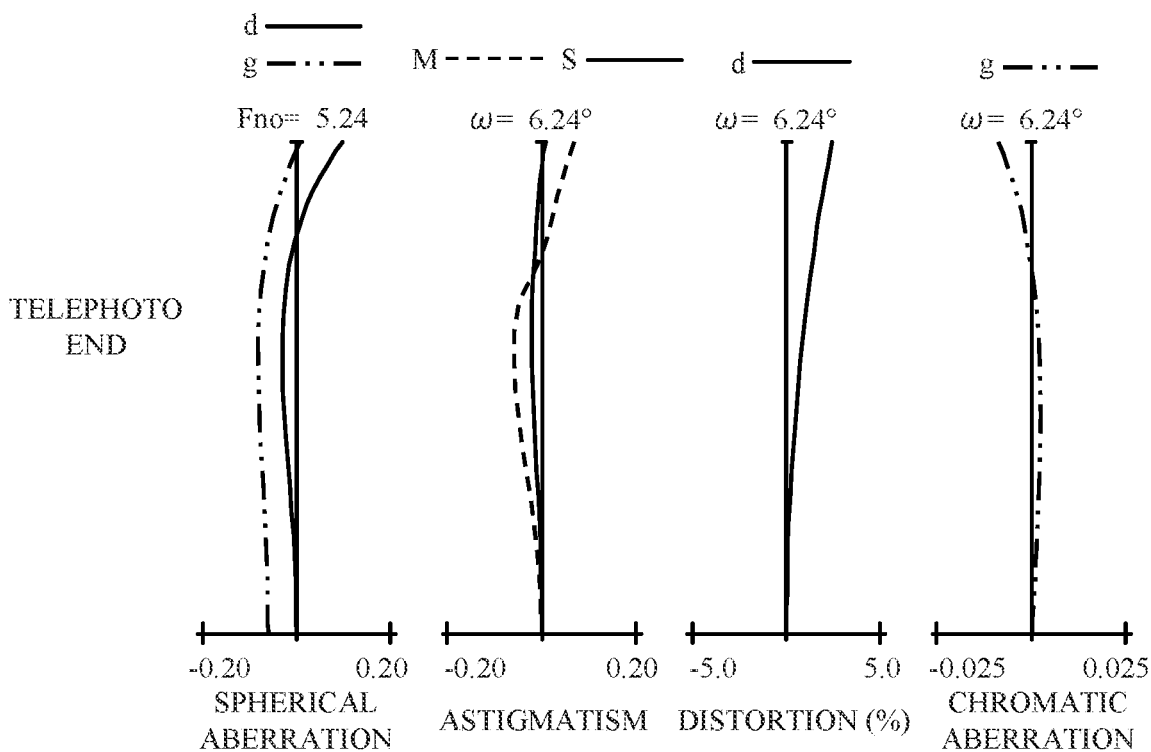

FIGS. 5A and 5B are aberration diagrams of the optical system 101 according to this example in an in-focus state at infinity, FIG. 5A illustrates aberration diagrams at the wide-angle end, and FIG. 5B illustrates aberration diagrams at the telephoto end. In each aberration diagram, Fno denotes an F-number, and ω is half an angle of view (°). In a spherical aberration diagram, a solid line represents spherical aberration for the d-line (wavelength of 587.6 nm), and an alternate long and two short dashes line represents spherical aberration for the g-line (wavelength of 435.8 nm). In the astigmatism diagram, a solid line S represents astigmatism on a sagittal image plane for the d-line, and a dashed line M represents astigmatism on a meridional image plane for the d-line. A distortion diagram illustrates distortion for the d-line. A chromatic aberration diagram illustrates lateral chromatic aberration for the g-line. These are similarly applicable to subsequent aberration diagrams.

Figure 6:
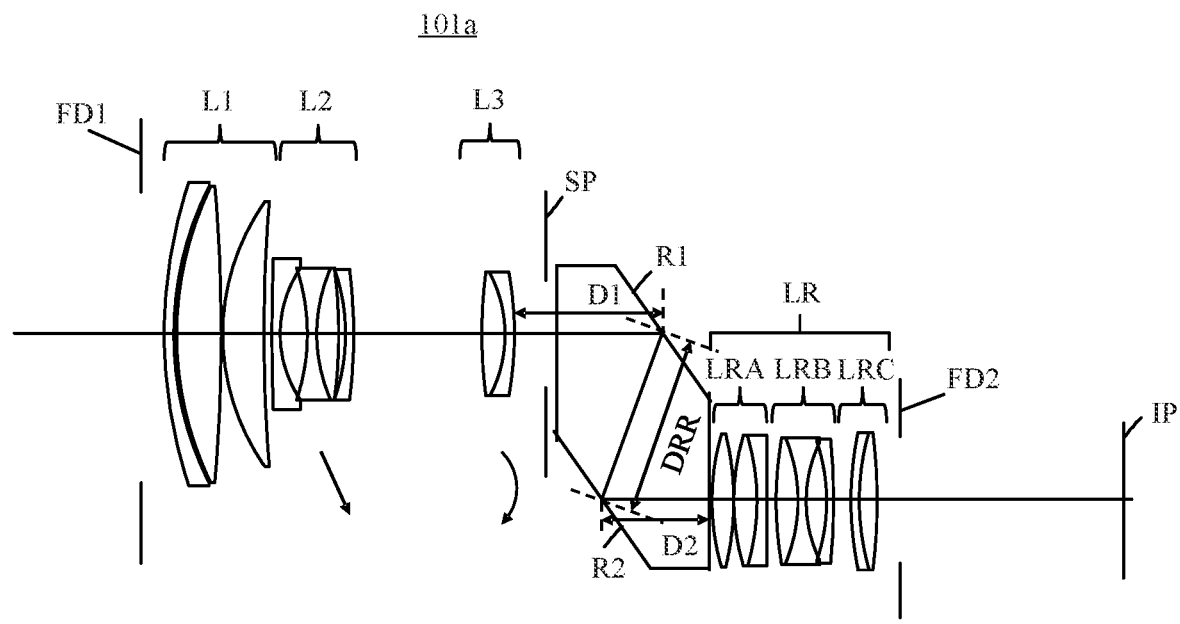
FIG. 6 is a sectional view of an optical system according to Example 2.

Referring now to FIGS. 6 to 12B, a description will be given of optical systems 101a, 101b, and 101c according to Examples 2 to 4. FIG. 6 is a sectional view of the optical system 101a according to Example 2. In this example, as in Example 1, both the first reflective surface R1 and the second reflective surface R2 include a prism. However, in this example, unlike Example 1, the first reflective surface R1 and the second reflective surface R2 are formed on a single prism. That is, the first reflective surface R1 and the second reflective surface R2 according to this example are reflective surfaces of an integrally molded optical element (integrated prism). This configuration can more easily increase the degree of parallelism between the first reflective surface R1 and the second reflective surface R2, have fewer manufacturing errors, and thus higher image quality than a configuration that uses different members for these two reflective surfaces. The integrated prism may have a parallelepiped shape made by extruding a parallelogram that is made by joining two right-angled prisms, in a direction orthogonal to the paper plane of the sectional view illustrated in FIG. 6 or may have a polyhedral shape that is made smaller by cutting out a portion that is unnecessary for bending of the optical path.

This example is different from Example 1 in that the incident angle α of the on-axis principal ray in this example is 35° on the first reflective surface R1 and the second reflective surface R2 whereas the incident angle α of Example 1 is 45°, where the incident angle α is an angle between a line normal to the reflective surface and an incident light ray, as illustrated in FIGS. 4A and 4B. In each example, the incident angle α (°) is set to a range of 20<α<50. The incident angle α may be set to 20<α<46. Reflecting a light ray at a more acute angle on the reflective surface can reduce an apparent curvature difference between the meridional section and the sagittal section, thereby reduce an astigmatic difference, and have an effective configuration for high image quality, in a case where the reflective surface has curvature due to a manufacturing error.

In this example, a third lens unit L3 having positive refractive power is disposed between the second lens unit L2 and the first reflective surface R1. Therefore, the optical system 101a includes, in order from the object side, a first lens unit L1 having positive refractive power, a second lens unit L2 having negative refractive power, a third lens unit L3 having positive refractive power, and a rear lens unit LR having positive refractive power. An afocal optical system that performs only magnification variation with the lens units L1, L2, and L3 can collimate and guide an on-axis light flux to the first reflective surface R1 and subsequent optical elements, and thereby it becomes easier to reduce an effective diameter after the optical path is bent. Therefore, it becomes easy to avoid interference between the two optical systems 101 and 102. In this case, since there is little variation in aberration on the object side of the first reflective surface R1 during magnification variation, aberration correction by the rear lens unit LR is facilitated.

The rear lens unit LR includes a rear A lens unit LRA, a rear B lens unit LRB, and a rear C lens unit LRC. The rear B lens unit LRB may be movable in a direction orthogonal to the optical axis for image stabilization. The rear A lens unit LRA is a lens unit on the object side of the rear B lens unit LRB. The rear C lens unit LRC is a lens unit on the image side of the rear B lens unit LRB.

Figure 7:
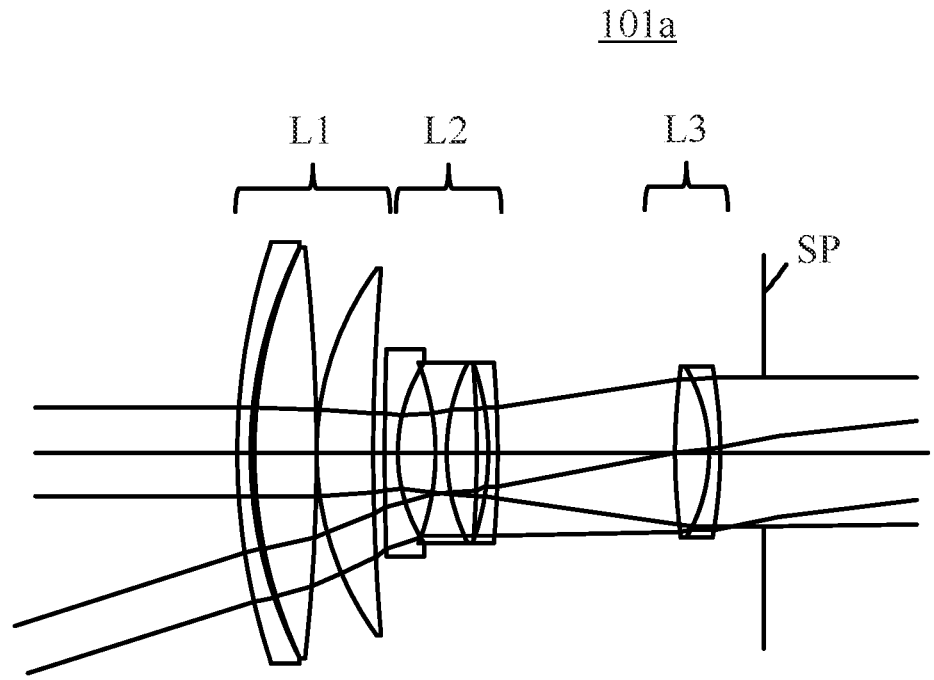
FIG. 7 is an optical path diagram of the optical system according to Example 2.

FIG. 7 is an optical path diagram regarding the lens units L1, L2, and L3 in the optical system 101a. The optical path diagram of FIG. 7 illustrates the on-axis angle of view and the most off-axis angle of view. The afocal here is not limited to a case where the marginal ray of the on-axis light beam is completely parallel to the optical axis, but may have an angle of about ±10°.

In this example, the third lens unit L3 is movable during magnification variation but may not be moved during magnification variation in a case where the rear lens unit LR may compensate for the position of the image plane. Alternatively, a second N lens unit L2N having negative refractive power may be disposed between the second lens unit L2 and the third lens unit L3 to serve as a unit that compensates for the position of the image plane during magnification variation. The third lens unit L3 may include one positive lens and one negative lens in order to satisfactorily correct chromatic aberration.

The configuration according to this example has four units that include a first lens unit L1 having positive refractive power, a second lens unit L2 having negative refractive power, a third lens unit L3 having positive refractive power, a first reflective surface R1, a second reflective surface R2, and a rear lens unit LR having positive refractive power. This configuration can minimize the number of lens units, and provide the imaging optical system 100 as a compact and high-quality magnification-varying optical system.

In this example, the first lens unit L1 is not moved during magnification variation. This configuration eliminates a shift of the optical axis of the first lens unit L1 during magnification variation, and provides a configuration suitable for high image quality.

The optical system 101a may satisfy at least one of the following inequalities (8) to (12). This is similarly applicable to optical systems 101b and 101c according to Examples 3 and 4, which will be described below.

$$1.00 < |fRA/fRB| < 2.00 \quad (8)$$

$$0.20 < f3/ft < 1.00 \quad (9)$$

$$0.20 < 3/\min(D3R) < 1.40 \quad (10)$$

$$0.20 < \min(D3R)/\max(Dtotal) < 0.80 \quad (11)$$

$$0.60 < f3/fw < 3.00 \quad (12)$$

Here, fRA and fRB are focal lengths of the rear A lens unit LRA and the rear B lens unit LRB, respectively, in a case where the rear lens unit LR has an image stabilizing function. f3 is a focal length of the third lens unit L3. ft is a focal length at the telephoto end of the entire optical system 101. D3R is a distance along the optical axis between the third lens unit L3 and the rear lens unit LR. That is, the distance D3R is a sum (D1+DRR+D2) of the distance D1 along the optical axis between the optical surface closest to the image plane in the third lens unit L3 and the first reflective surface R1, the distance DRR, and the distance D2 along the optical axis between the second reflective surface R2 and an optical surface closest to the object in the rear lens unit LR. min(D3R) is a minimum value of the distance D3R during magnification variation. Dtotal is a distance along the optical axis between the optical surface closest to the object and the optical surface closest to the image plane in the optical system 101, and Max(Dtotal) is a maximum value of the distance Dtotal during magnification variation. The term "optical surface," as used in this example, means a boundary surface through which a light ray passes during a use state and a surface extending with the same radius of curvature as the boundary surface. In particular, a reflective surface is also defined as the optical surface. In each example, a distance means an actual length.

Inequality (8) defines a range regarding a refractive power relationship between the movable unit and the non-movable unit in the rear lens unit LR in a case where the rear lens unit LR provides image stabilization. In this example, the rear B lens unit LRB in the rear lens unit LR is movable by a moving amount having a component in the direction orthogonal to the optical axis for image stabilization. Thereby, the image stabilization can be performed, and this configuration is suitable for high image quality. For the image stabilization, at least one of the rear A lens unit LRA and the rear C lens unit LRC may be provided. However, both the rear A lens unit LRA and the rear C lens unit LRC may be provided in order to prevent the moving amount of the rear B lens unit LRB for the image stabilization from being excessively large, to improve the image stabilizing sensitivity of the rear B lens unit LRB to some extent, and to satisfactorily correct aberrations. The image stabilizing sensitivity is a ratio $|\Delta2/\Delta1|$ of a moving amount $\Delta2$ of an imaging point on the image plane to a moving amount $\Delta1$ in the direction orthogonal to the optical axis of the image stabilizing lens unit.

In a case where the value is higher than the upper limit of inequality (8), the negative refractive power becomes strong and the image stabilizing performance is improved, but the lens diameter in the rear lens unit LR becomes larger and it is difficult to avoid physical interference between the optical systems 101 and 102. On the other hand, in a case where the value is lower than the lower limit of inequality (8), the negative refractive power becomes too weak and sufficient image stabilizing performance cannot be obtained. The numerical range of inequality (8) may be set to that of inequality (8a) or (8b) below in order to maximize the image stabilizing performance and avoid the physical interference described above.

$$1.10 < |fRA/fRB| < 1.90 \quad (8a)$$

$$1.29 < |fRA/fRB| < 1.70 \quad (8b)$$

Inequality (9) defines a range regarding the focal length of the third lens unit L3. In a case where the value is lower than the lower limit of inequality (9), the third lens unit L3 makes higher an angle of an off-axis light beam and the lens diameter of the rear lens unit LR becomes large. On the other hand, in a case where the value is higher than the upper limit of inequality (9), the refractive power of the third lens unit L3 becomes too weak, the distance between the second lens unit L2 and the third lens unit L3 becomes longer, and the diameter of the front lens increases. In addition, since the optical overall length becomes long, this is unsuitable for miniaturization. The numerical range of inequality (9) may be set to that of inequality (9a) or (9b) below in order to reduce the size of the entire optical system.

$$0.30 < f3/ft < 0.80 \quad (9a)$$

$$0.45 < f3/ft < 0.60 \quad (9b)$$

Inequality (10) defines a range regarding the focal length of the third lens unit L3 and the distance between the third lens unit L3 and the rear lens unit LR necessary to insert the reflecting member. In a case where the value is lower than the lower limit of inequality (10), the refractive power of the third lens unit L3 becomes too strong, and it becomes difficult to correct coma and astigmatism. In a case where the value is higher than the upper limit of inequality (10), the overall optical length will be longer and unsuitable for miniaturization. The numerical range of inequality (10) may be set to that of inequality (10a) or (10b) below in order to achieve both the aberration correction and miniaturization of the optical system in a well-balanced manner.

$$0.30<f3/\min(D3R)<1.35 \quad (10a)$$

$$0.54<f3/\min(D3R)<1.30 \quad (10b)$$

Inequality (11) defines a range that may be satisfied over the entire magnification varying range by the distance D3R between the third lens unit L3 and the rear lens unit LR, and the distance Dtotal along the optical axis from the most object-side optical surface to the most image-side optical surface in the optical system 101. In a case where the value is lower than the lower limit of inequality (11), the distance between the third lens unit L3 and the rear lens unit LR becomes too narrow and the baseline length necessary for natural stereoscopic vision cannot be obtained. On the other hand, in a case where the value is higher than the upper limit of inequality (11), the optical path bending portion becomes too long and large relative to the overall length of the optical system 101 and it becomes difficult to realize a compact optical system. The numerical range of inequality (11) may be set to that of inequality (11a) or (11b) below in order to achieve the stereoscopic effect and miniaturization of the optical system in a well-balanced manner.

$$0.25<\min(D3R)/\operatorname{Max}(D\text{total})<0.70 \quad (11a)$$

$$0.31<\min(D3R)/\operatorname{Max}(D\text{total})<0.57 \quad (11b)$$

Inequality (12) defines a range regarding the focal length of the third lens unit L3. In a case where the value is lower than the lower limit of inequality (12), the angle of the off-axis light flux in the third lens unit L3 becomes too high and the lens diameter of the rear lens unit LR becomes large. On the other hand, in a case where the value is higher than the upper limit of inequality (12), the refractive power of the third lens unit L3 becomes too weak, and both the distance between the second lens unit L2 and the third lens unit L3 and the diameter of the front lens increase. In addition, since the optical overall length becomes long, this is unsuitable for miniaturization. The numerical range of inequality (12) may be set to that of the following inequality (12a) or (12b) in order to reduce the size of the entire optical system.

$$0.80<f3/fw<2.50 \quad (12a)$$

$$1.25<f3/fw<1.67 \quad (12b)$$

Figure 8A:
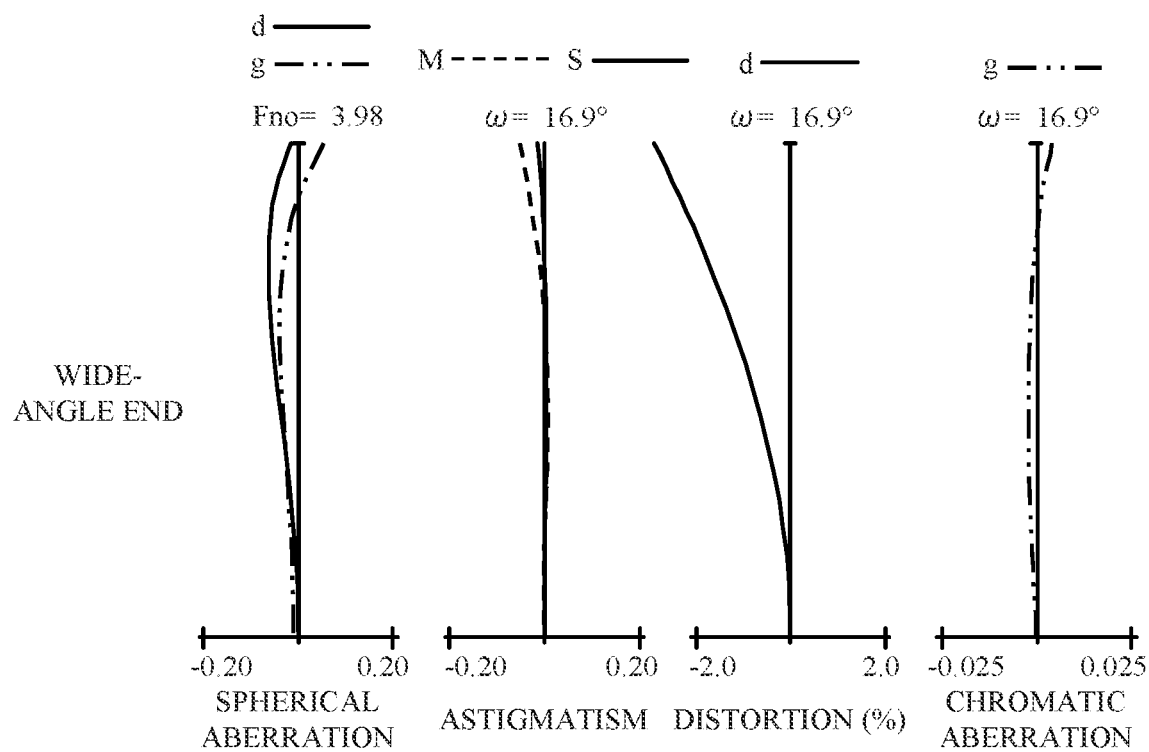
FIGS. 8A and 8B are aberration diagrams of the optical system according to Example 2.
Figure 8B:
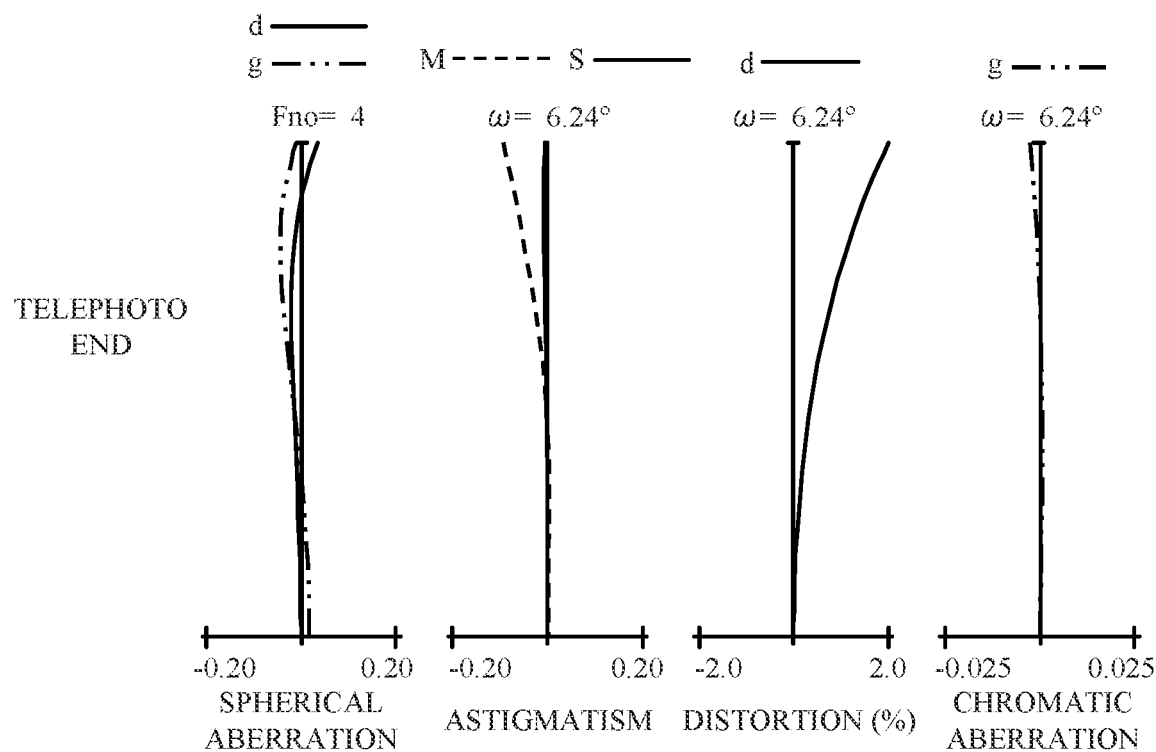

FIGS. 8A and 8B are aberration diagrams of the optical system 101a in this example in an in-focus state at infinity, FIG. 8A illustrates aberration diagrams at the wide-angle end, and FIG. 8B illustrates aberration diagrams at the telephoto end.

Figure 9:
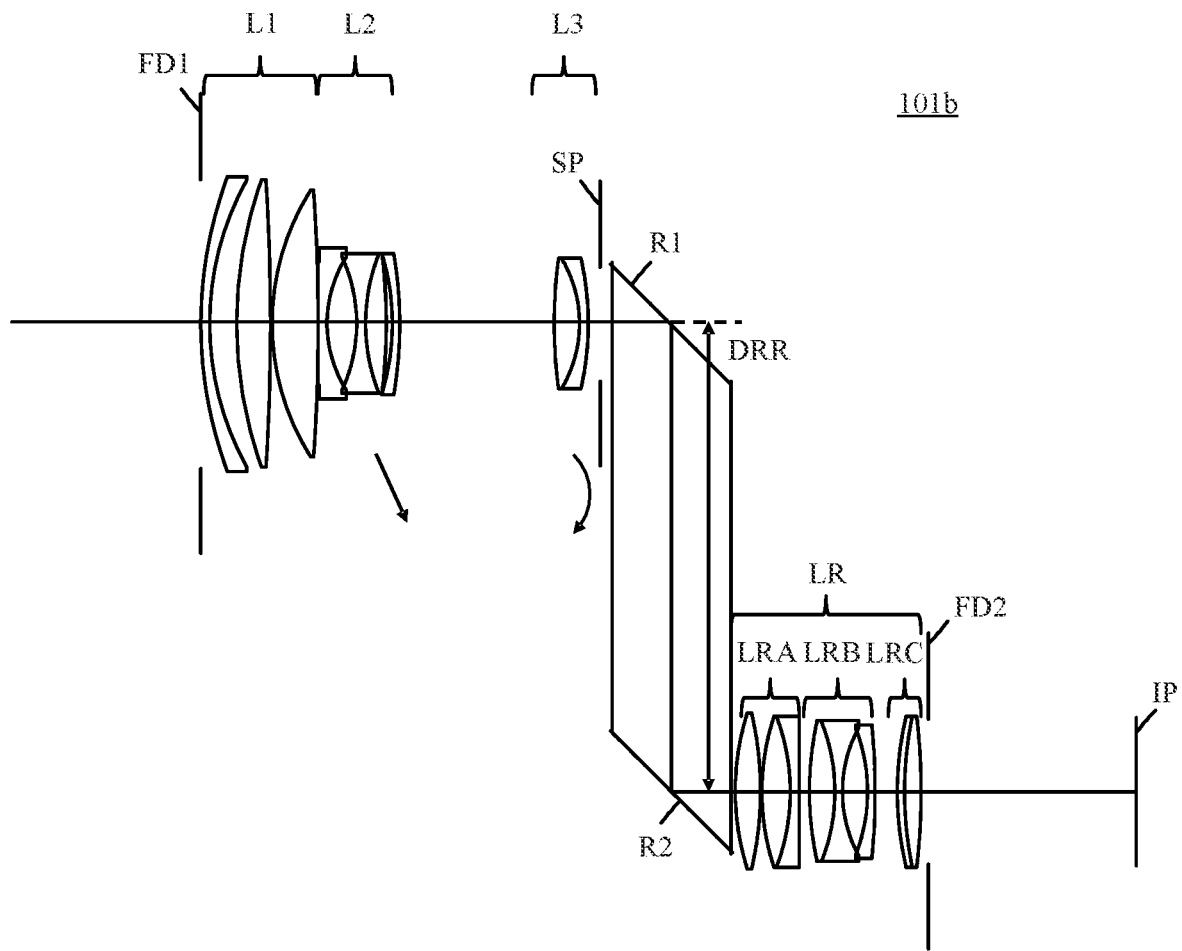
FIG. 9 is a sectional view of an optical system according to Example 3.
Figure 10A:
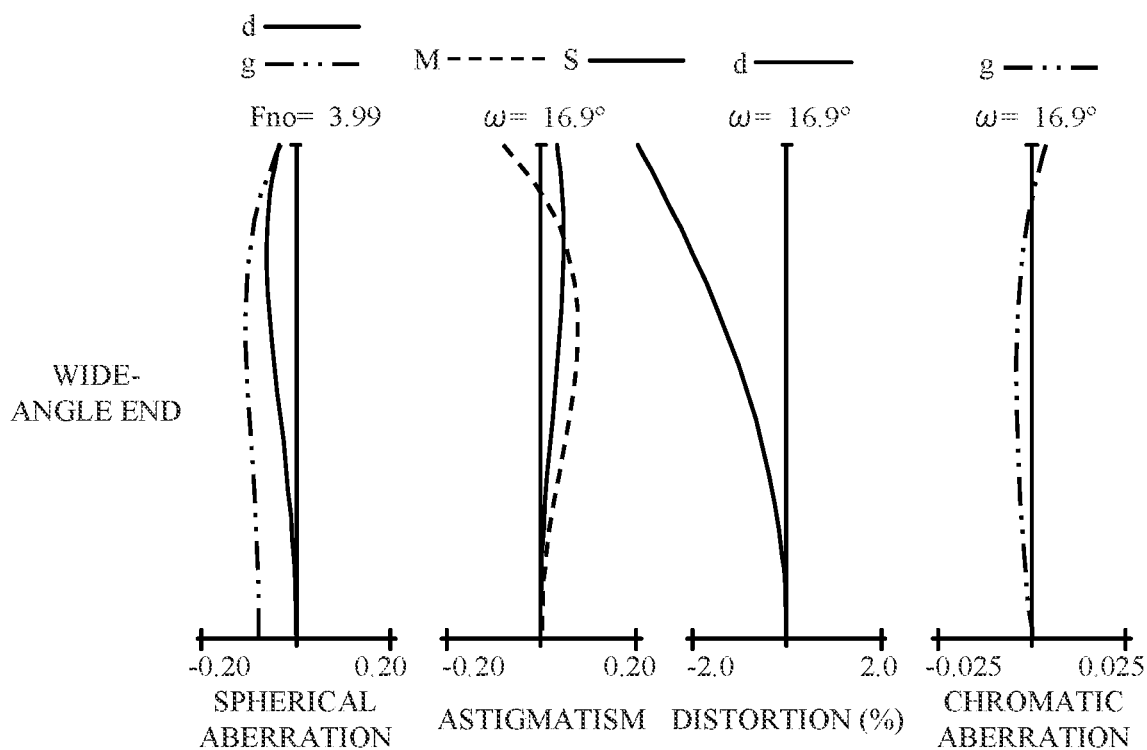
FIGS. 10A and 10B are aberration diagrams of the optical system according to Example 3.
Figure 10B:
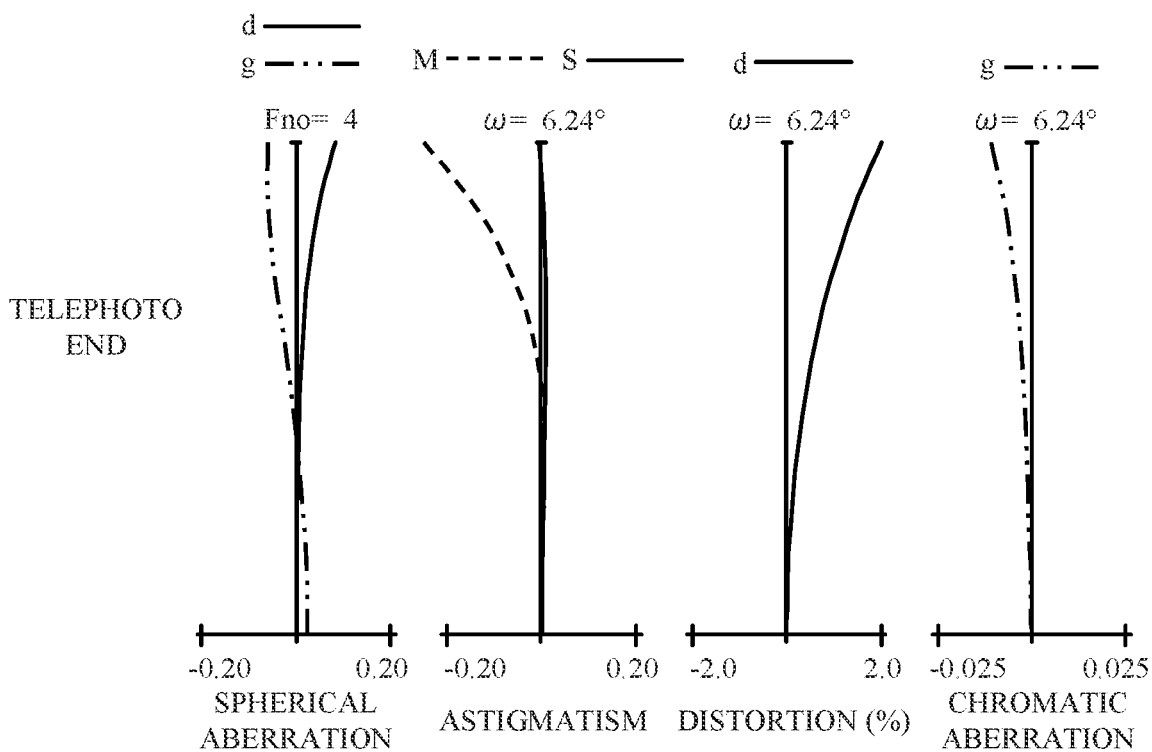

Referring now to FIGS. 9, 10A, and 10B, a description will be given of the optical system 101b according to Example 3. FIG. 9 is a sectional view of the optical system 101b according to this example. This example is different from the above examples in that the value of Dout/Din in inequality (1) is as small as 0.14, and this example can provide a stereoscopic image with an enhanced stereoscopic effect. In a case where the distance is made longer between the first reflective surface R1 and the second reflective surface R2, a prism may be used for the reflective surface instead of a plane mirror because it facilitates aberration correction. FIGS. 10A and 10B are aberration diagrams of the optical system 101b according to this example in an in-focus state at infinity, FIG. 10A illustrates aberration diagrams at the wide-angle end, and FIG. 10B illustrates aberration diagrams at the telephoto end.

Figure 11:
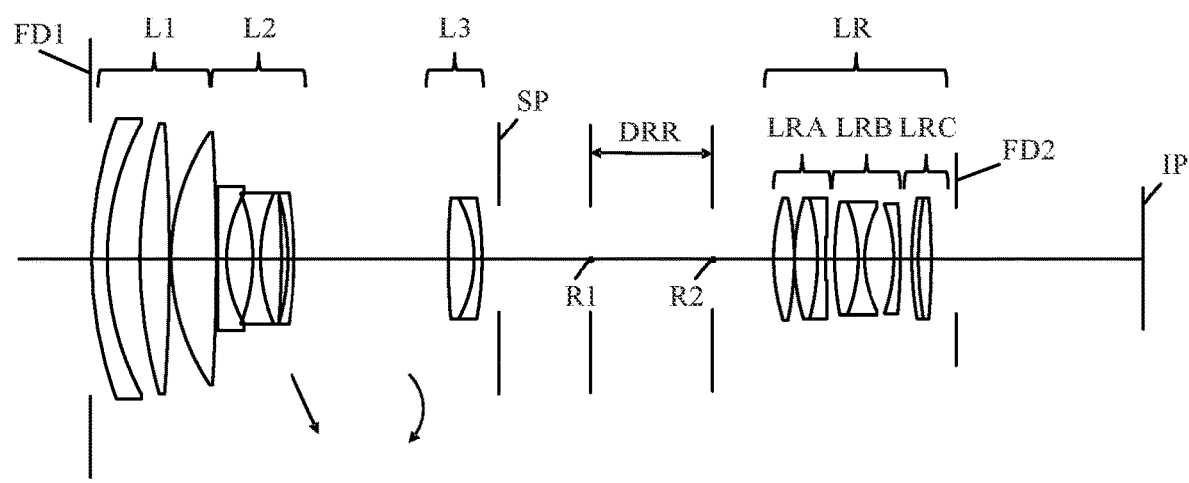
FIG. 11 is a sectional view of an optical system according to Example 4.
Figure 12A:
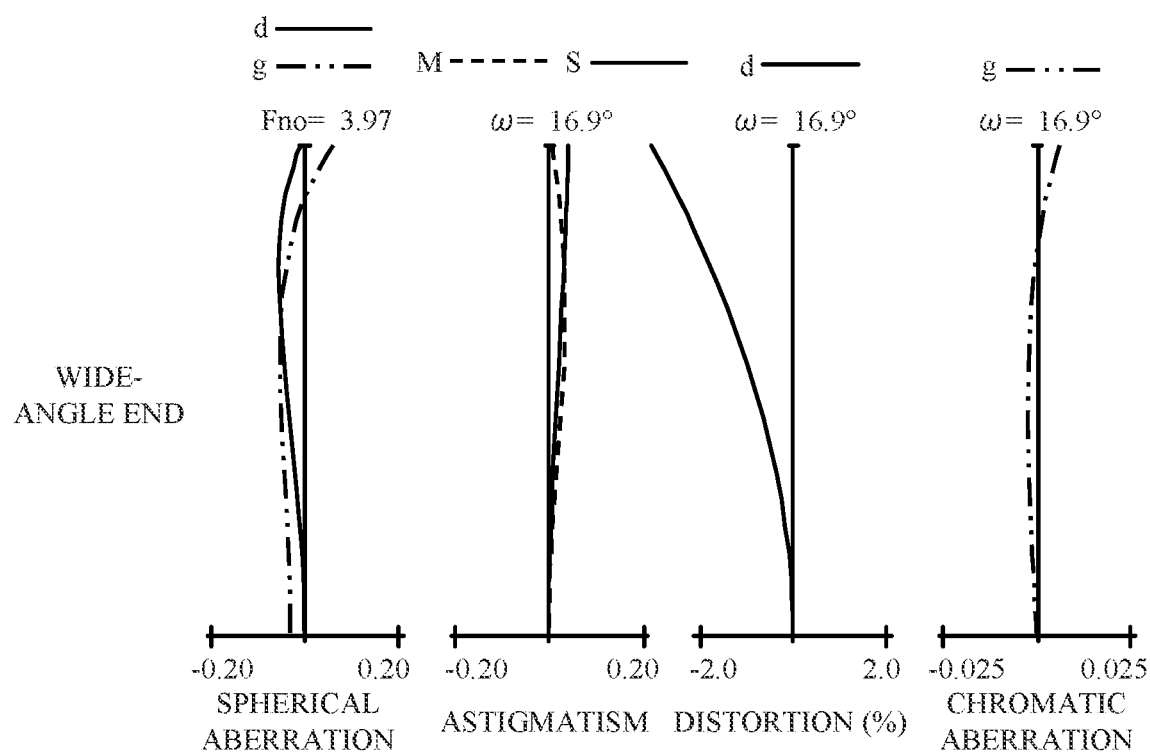
FIGS. 12A and 12B are aberration diagrams of the optical system according to Example 4.
Figure 12B:
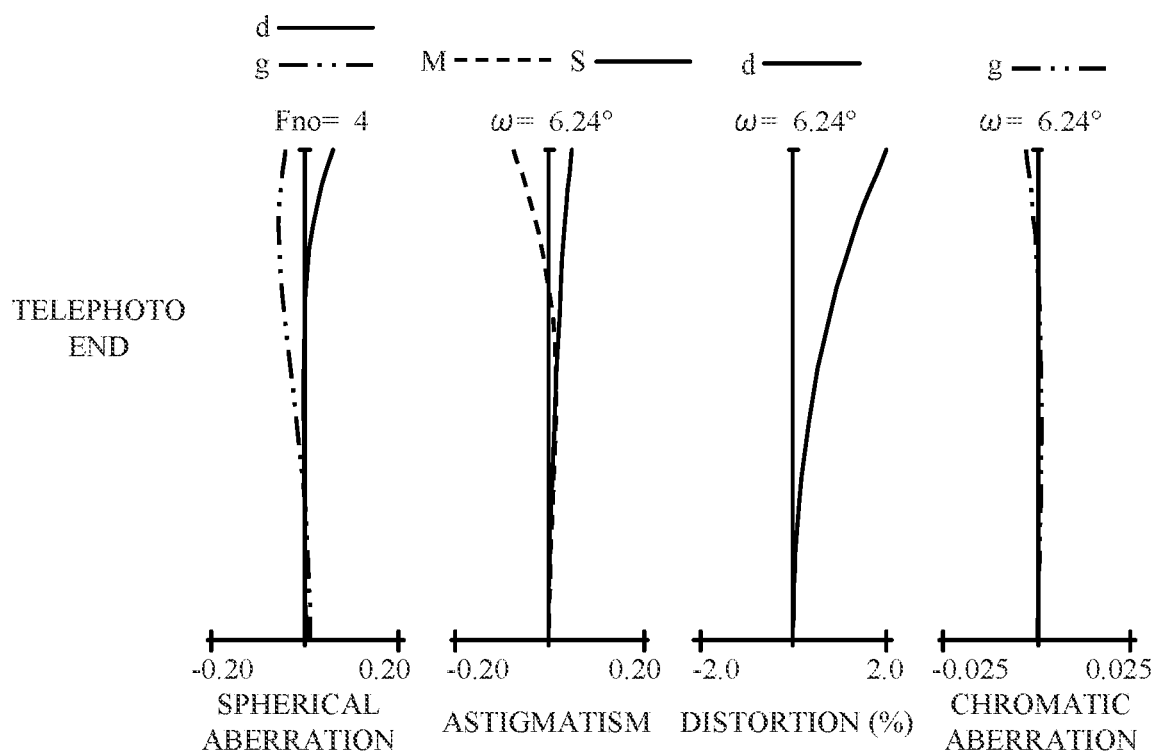

Referring now to FIGS. 11, 12A, and 12B, a description will be given of the optical system 101c according to Example 4. FIG. 11 is a sectional view of the optical system 101c according to this example. This example is different from each of the above examples in that the reflective surface includes a plane mirror.

FIGS. 12A and 12B are aberration diagrams of the optical system 101c according to this example in an in-focus state at infinity, FIG. 12A illustrates aberration diagrams at the wide-angle end, and FIG. 12B illustrates aberration diagrams at the telephoto end.

Numerical examples 1 to 4 corresponding to Examples 1 to 4 will be illustrated below. In each numerical example, a surface number is the order of optical surfaces counted from the object side. r is a radius of curvature of an i-th (i is a natural number) optical surface (i-th surface) counted from the object side, and d is a distance between the i-th surface and an (i+1)-th surface. nd and vd are a refractive index and an Abbe number for the d-line of the lens, respectively. The Abbe number vd of a certain material is calculated as follows:

$$vd=(Nd-1)/(NF-NC)$$

where Nd, NF, and NC are refractive indexes for the d-line (587.6 nm), the F-line (486.1 nm), and the C-line (656.3 nm) in the Fraunhofer line, respectively.

In each numerical example, each of d, focal length (mm). F-number, and half angle of view (degrees) has a value in a case where the optical system according to each example is in-focus on an object at infinity (infinity object). BF (back focus) is a distance on the optical axis from the final lens surface (the lens surface closest to the image plane) to a paraxial image plane in terms of air equivalent length. An "overall lens length" is a length obtained by adding the back focus BF to a distance on the optical axis from the frontmost surface (lens surface on the most object side) to the final surface of the optical system. The lens unit includes one or more lenses.

Numerical Example 1

| UNIT: mm | | | | | |
|---|---|---|---|---|---|
| Surface Data | | | | | |
| Surface No. | r | d | nd | vd | Effective Diameter |
| 1 | 61.533 | 1.00 | 1.85478 | 24.8 | 36.92 |
| 2 | 41.300 | 0.30 | | | 36.00 |
| 3 | 43.262 | 2.96 | 1.69680 | 55.5 | 36.00 |
| 4 | 91.486 | 0.10 | | | 35.74 |
| 5 | 66.448 | 3.23 | 1.59522 | 67.7 | 35.52 |
| 6 | −18590.409 | (Variable) | | | 35.21 |
| 7 | 17.356 | 1.00 | 1.80400 | 46.5 | 16.73 |
| 8 | 14.610 | 2.32 | | | 15.61 |
| 9 | 708.342 | 1.00 | 1.80400 | 46.5 | 15.53 |
| 10 | 13.667 | 1.96 | 1.80810 | 22.8 | 14.24 |
| 11 | 33.241 | 3.45 | | | 13.93 |
| 12 | −20.964 | 0.84 | 1.88300 | 40.8 | 13.20 |
| 13 | −32.689 | 0.00 | | | 13.31 |
| 14 | 67.508 | 1.13 | 1.90525 | 35.0 | 13.10 |
| 15 | 108.263 | (Variable) | | | 12.90 |
| 16(Aperture Stop) | ∞ | 1.32 | | | 7.65 |
| 17 | ∞ | 10.00 | 1.51633 | 64.1 | 20.00 |
| 18 | ∞ | 10.00 | 1.51633 | 64.1 | 28.00 |
| 19 | ∞ | 1.00 | | | 20.00 |
| 20 | ∞ | 10.00 | 1.51633 | 64.1 | 20.00 |
| 21 | ∞ | 10.00 | 1.51633 | 64.1 | 28.00 |
| 22 | ∞ | (Variable) | | | 20.00 |

-continued

UNIT: mm

| | | | | | |
|---|---|---|---|---|---|
| 23 | 32.482 | 2.44 | 1.53775 | 74.7 | 14.62 |
| 24 | −33.960 | 0.10 | | | 14.71 |
| 25 | 16.125 | 3.15 | 1.43875 | 94.9 | 14.52 |
| 26 | −40.802 | 1.03 | 1.85478 | 24.8 | 14.25 |
| 27 | 97.774 | 5.37 | | | 13.90 |
| 28 | 26.279 | 2.95 | 1.72047 | 34.7 | 12.61 |
| 29 | −14.430 | 0.82 | 1.69680 | 55.5 | 12.34 |
| 30 | 11.440 | 2.59 | | | 11.06 |
| 31 | −14.957 | 0.78 | 1.88300 | 40.8 | 11.07 |
| 32 | −19.637 | 1.40 | | | 11.51 |
| 33 | 53.143 | 0.78 | 1.91650 | 31.6 | 12.32 |
| 34 | 17.979 | 2.05 | 1.68893 | 31.1 | 12.38 |
| 35 | −79.431 | (Variable) | | | 12.49 |
| Image Plane | ∞ | | | | |

Various Data
ZOOM RATIO 2.78

| | WIDE-ANGLE | MIDDLE | TELE-PHOTO |
|---|---|---|---|
| Focal Length: | 28.80 | 41.71 | 79.99 |
| FNO | 5.60 | 5.60 | 5.59 |
| Half Angle of View (degrees) | 16.90 | 11.85 | 6.24 |
| Image Height | 8.75 | 8.75 | 8.75 |
| Overall lens length | 140.00 | 153.36 | 158.68 |
| BF | 33.27 | 33.27 | 33.27 |
| d 6 | 1.00 | 19.07 | 38.36 |
| d15 | 19.68 | 14.97 | 1.00 |
| d22 | 1.00 | 1.00 | 1.00 |
| d35 | 33.27 | 33.27 | 33.27 |
| Entrance Pupil Position | 2.9.98 | 67.68 | 116.41 |
| Exit Pupil Position | −69.27 | −69.27 | −69.27 |
| Front Principal Point Position | 50.69 | 92.42 | 134.00 |
| Rear Principal Point Position | 4.47 | −8.45 | −46.73 |

Zoom Lens Unit Data

| Lens Unit | Starting Surface | Focal Length | Lens Configuration Length | Front Principal Point Position | Rear Principal Point Position |
|---|---|---|---|---|---|
| L1 | 1 | 93.38 | 7.59 | 0.66 | −4.07 |
| L2 | 7 | −24.77 | 11.69 | 5.17 | −3.90 |
| LM | 16 | ∞ | 0.32 | 14.35 | −14.35 |
| LR | 23 | 32.82 | 23.46 | −10.57 | −23.42 |

Single Lens Data

| Lens | Starting Surface | Focal Length |
|---|---|---|
| 1 | 1 | −150.36 |
| 2 | 3 | 114.89 |
| 3 | 5 | 111.25 |
| 4 | 7 | −137.15 |
| 5 | 9 | −17.34 |
| 6 | 10 | 27.49 |
| 7 | 12 | −68.49 |
| 8 | 14 | 195.53 |
| 9 | 17 | 0.00 |
| 10 | 18 | 0.00 |
| 11 | 20 | 0.00 |
| 12 | 21 | 0.00 |
| 13 | 23 | 31.17 |
| 14 | 25 | 26.79 |
| 15 | 26 | −33.56 |
| 16 | 28 | 13.33 |
| 17 | 29 | −9.04 |
| 18 | 31 | −77.08 |
| 19 | 33 | −29.97 |
| 20 | 34 | 21.46 |

Numerical Example 2

UNIT: mm

Surface Data

| Surface No. | r | d | nd | vd | Effective Diameter |
|---|---|---|---|---|---|
| 1 | 55.290 | 1.00 | 1.80810 | 22.8 | 32.98 |
| 2 | 36.349 | 0.37 | | | 32.10 |
| 3 | 38.952 | 5.05 | 1.59522 | 67.7 | 32.10 |
| 4 | −161.885 | 0.10 | | | 31.86 |
| 5 | 25.530 | 4.57 | 1.43875 | 94.7 | 28.60 |
| 6 | 159.630 | (Variable) | | | 27.94 |
| 7 | 164.950 | 1.00 | 1.85026 | 32.3 | 15.72 |
| 8 | 13.433 | 3.11 | | | 13.77 |
| 9 | −21.804 | 1.00 | 1.51633 | 64.1 | 13.73 |
| 10 | 17.581 | 2.41 | 1.80810 | 22.8 | 13.75 |
| 11 | −75.114 | 0.85 | | | 13.65 |
| 12 | −22.345 | 0.84 | 1.72916 | 54.7 | 13.62 |
| 13 | −70.712 | (Variable) | | | 13.70 |
| 14 | 54.947 | 2.74 | 1.73400 | 51.5 | 12.90 |
| 15 | −13.889 | 1.01 | 1.89190 | 37.1 | 12.79 |
| 16 | −35.761 | (Variable) | | | 12.73 |
| 17(Aperture Stop) | ∞ | 1.32 | | | 12.07 |
| 18 | ∞ | 12.00 | 1.51633 | 64.1 | 23.00 |
| 19 | ∞ | 20.00 | 1.51633 | 64.1 | 25.00 |
| 20 | ∞ | 12.00 | 1.51633 | 64.1 | 25.00 |
| 21 | ∞ | (Variable) | | | 23.00 |
| 22 | 26.982 | 2.42 | 1.53775 | 74.7 | 14.03 |
| 23 | −35.836 | 0.10 | | | 14.06 |
| 24 | 27.834 | 2.65 | 1.43875 | 94.7 | 13.80 |
| 25 | −23.912 | 1.03 | 1.85478 | 24.8 | 13.58 |
| 26 | 3121.471 | (Variable) | | | 13.45 |
| 27 | 41.313 | 2.59 | 1.74000 | 28.3 | 13.33 |
| 28 | −17.992 | 0.82 | 1.70154 | 41.2 | 13.16 |
| 29 | 14.792 | 2.34 | | | 12.36 |
| 30 | −22.095 | 0.78 | 1.69680 | 55.5 | 12.39 |
| 31 | −83.146 | (Variable) | | | 12.93 |
| 32 | 40.512 | 0.78 | 1.91650 | 31.6 | 14.27 |
| 33 | 26.938 | 2.04 | 1.79360 | 37.1 | 14.38 |
| 34 | −71.942 | (Variable) | | | 14.49 |
| Image Plane | ∞ | | | | |

Various Data
ZOOM RATIO 2.78

| | WIDE-ANGLE | MIDDLE | TELE-PHOTO |
|---|---|---|---|
| Focal Length: | 28.80 | 41.08 | 80.00 |
| FNO | 3.98 | 3.98 | 4.00 |
| Half Angle of View (degrees) | 16.90 | 12.02 | 6.24 |
| Image Height | 8.75 | 8.75 | 8.75 |
| Overall lens length | 135.00 | 135.00 | 134.99 |
| BF | 27.91 | 28.23 | 28.90 |
| d 6 | 0.93 | 6.56 | 13.43 |
| d13 | 14.46 | 10.45 | 1.00 |
| d16 | 3.45 | 1.81 | 4.37 |
| d21 | 0.30 | 0.30 | 0.50 |
| d26 | 0.97 | 1.32 | 0.47 |
| d31 | 2.06 | 1.39 | 1.39 |
| d34 | 27.91 | 28.23 | 28.90 |
| Entrance Pupil Position | 28.49 | 45.47 | 81.51 |
| Exit Pupil Position | −84.09 | −76.87 | −77.86 |
| Front Principal Point Position | 49.89 | 70.50 | 101.56 |
| Rear Principal Point Position | −0.89 | −12.85 | −51.10 |

Zoom Lens Unit Data

| Lens Unit | Starting Surface | Focal Length | Lens Configuration Length | Front Principal Point Position | Rear Principal Point Position |
|---|---|---|---|---|---|
| L1 | 1 | 39.12 | 11.09 | 2.72 | −4.69 |
| L2 | 7 | −12.32 | 9.20 | 1.59 | −5.06 |
| L3 | 14 | 37.57 | 3.75 | 1.32 | −0.84 |

-continued

UNIT: mm

| | | | | |
|---|---|---|---|---|
| LM | 17 | ∞ | 5.32 | 15.17 −15.17 |
| LRA | 22 | 29.20 | 6.21 | −0.31 −4.25 |
| LRB | 27 | −20.32 | 6.53 | 3.86 −1.03 |
| LRC | 32 | 34.72 | 2.83 | 0.53 −1.04 |

Single Lens Data

| Lens | Starting Surface | Focal Length |
|---|---|---|
| 1 | 1 | −134.48 |
| 2 | 3 | 53.25 |
| 3 | 5 | 68.55 |
| 4 | 7 | −17.25 |
| 5 | 9 | −18.69 |
| 6 | 10 | 17.84 |
| 7 | 12 | −45.13 |
| 8 | 14 | 15.36 |
| 9 | 15 | −26.03 |
| 10 | 18 | 0.00 |
| 11 | 19 | 0.00 |
| 12 | 20 | 0.00 |
| 13 | 22 | 29.02 |
| 14 | 24 | 29.78 |
| 15 | 25 | −27.76 |
| 16 | 27 | 17.26 |
| 17 | 28 | −11.45 |
| 18 | 30 | −43.41 |
| 19 | 32 | −90.21 |
| 20 | 33 | 24.92 |

Numerical Example 3

UNIT: mm

Surface Data

| Surface No. | r | d | nd | vd | Effective Diameter |
|---|---|---|---|---|---|
| 1 | ∞ | 1.00 | | | 34.20 |
| 2 | 50.774 | 1.00 | 1.80810 | 22.8 | 33.36 |
| 3 | 35.103 | 3.13 | | | 32.44 |
| 4 | 50.401 | 4.04 | 1.59522 | 67.7 | 32.52 |
| 5 | −238.185 | 0.10 | | | 32.34 |
| 6 | 28.709 | 5.40 | 1.43875 | 94.7 | 30.13 |
| 7 | −335.318 | (Variable) | | | 29.59 |
| 8 | 891.959 | 1.00 | 1.85026 | 32.3 | 16.60 |
| 9 | 15.061 | 3.45 | | | 14.78 |
| 10 | −19.903 | 1.00 | 1.51633 | 64.1 | 14.75 |
| 11 | 20.707 | 2.50 | 1.80810 | 22.8 | 15.19 |
| 12 | −80.461 | 0.78 | | | 15.17 |
| 13 | −28.235 | 0.84 | 1.72916 | 54.7 | 15.15 |
| 14 | −46.634 | (Variable) | | | 15.29 |
| 15 | 71.305 | 2.88 | 1.73400 | 51.5 | 14.39 |
| 16 | −15.739 | 1.00 | 1.89190 | 37.1 | 14.30 |
| 17 | −39.124 | (Variable) | | | 14.27 |
| 18(Aperture Stop) | ∞ | 1.32 | | | 13.45 |
| 19 | ∞ | 7.00 | 1.51633 | 64.1 | 13.27 |
| 20 | ∞ | −55.00 | | | 18.76 |
| 21 | ∞ | 7.00 | | | 19.10 |
| 22 | ∞ | (Variable) | | | 16.49 |
| 23 | 27.814 | 3.10 | 1.53775 | 74.7 | 17.08 |
| 24 | −38.441 | 0.10 | | | 17.07 |
| 25 | 29.313 | 3.26 | 1.43875 | 94.7 | 16.44 |
| 26 | −25.951 | 1.03 | 1.85478 | 24.8 | 16.14 |
| 27 | 1712.494 | (Variable) | | | 15.84 |
| 28 | 40.391 | 2.97 | 1.74000 | 28.3 | 15.36 |
| 29 | −20.626 | 0.82 | 1.70154 | 41.2 | 15.12 |
| 30 | 14.724 | 3.01 | | | 13.83 |

-continued

UNIT: mm

| | | | | | |
|---|---|---|---|---|---|
| 31 | −21.090 | 0.78 | 1.69680 | 55.5 | 13.85 |
| 32 | −86.303 | (Variable) | | | 14.48 |
| 33 | 39.734 | 0.78 | 1.91650 | 31.6 | 16.61 |
| 34 | 40.004 | 1.95 | 1.79360 | 37.1 | 16.65 |
| 35 | −92.532 | 1.00 | | | 16.72 |
| 36 | ∞ | (Variable) | | | 16.76 |
| Image Plane | ∞ | | | | |

Various Data
ZOOM RATIO 2.78

| | WIDE-ANGLE | MIDDLE | TELE-PHOTO |
|---|---|---|---|
| Focal Length: | 28.80 | 35.08 | 80.00 |
| FNO | 3.99 | 3.95 | 4.00 |
| Half Angle of View (degrees) | 16.90 | 14.01 | 6.24 |
| Image Height | 8.75 | 8.75 | 8.75 |
| Overall lens length | 165.90 | 165.91 | 165.89 |
| BF | 24.33 | 25.30 | 26.09 |
| d 7 | 0.13 | 3.68 | 14.21 |
| d14 | 18.18 | 14.44 | 1.10 |
| d17 | 1.52 | 1.72 | 4.45 |
| d22 | 0.46 | 0.30 | 0.30 |
| d27 | 1.33 | 1.82 | 1.11 |
| d32 | 2.70 | 1.39 | 1.39 |
| d36 | 24.33 | 25.30 | 26.09 |
| Entrance Pupil Position | 29.32 | 37.47 | 77.59 |
| Exit Pupil Position | −248.12 | −183.77 | −180.41 |
| Front Principal Point Position | 55.08 | 66.67 | 126.59 |
| Rear Principal Point Position | −4.47 | −9.78 | −53.91 |

Zoom Lens Unit Data

| Lens Unit | Starting Surface | Focal Length | Lens Configuration Length | Front Principal Point Position | Rear Principal Point Position |
|---|---|---|---|---|---|
| L1 | 1 | 41.63 | 14.67 | 7.45 | −3.60 |
| L2 | 8 | −14.55 | 9.57 | 1.00 | −6.26 |
| L3 | 15 | 43.79 | 3.88 | 1.47 | −0.76 |
| LM | 18 | ∞ | −39.68 | 23.41 | −23.41 |
| LRA | 23 | 30.25 | 7.50 | −0.32 | −5.07 |
| LRB | 28 | −19.53 | 7.58 | 4.57 | −1.24 |
| LRC | 33 | 35.30 | 3.74 | 0.41 | −2.10 |

Single Lens Data

| Lens | Starting Surface | Focal Length |
|---|---|---|
| 1 | 1 | −144.87 |
| 2 | 4 | 70.25 |
| 3 | 6 | 60.55 |
| 4 | 8 | −18.03 |
| 5 | 10 | −19.49 |
| 6 | 11 | 20.61 |
| 7 | 13 | −100.07 |
| 8 | 15 | 17.82 |
| 9 | 16 | −30.13 |
| 10 | 19 | 0.00 |
| 11 | 20 | 0.00 |
| 12 | 21 | 0.00 |
| 13 | 23 | 30.51 |
| 14 | 25 | 31.95 |
| 15 | 26 | −29.90 |
| 16 | 28 | 18.84 |
| 17 | 29 | −12.13 |
| 18 | 31 | −40.25 |
| 19 | 33 | 2689.60 |
| 20 | 34 | 35.42 |

Numerical Example 4

UNIT: mm

Surface Data

| Surface No. | r | d | nd | vd | Effective Diameter |
|---|---|---|---|---|---|
| 1 | ∞ | 0.10 | | | 34.00 |
| 2 | 50.402 | 1.92 | 1.80810 | 22.8 | 33.35 |
| 3 | 35.017 | 4.14 | | | 32.08 |
| 4 | 61.018 | 3.60 | 1.59522 | 67.7 | 32.15 |
| 5 | −198.013 | 0.10 | | | 32.00 |
| 6 | 27.196 | 5.68 | 1.43875 | 94.7 | 29.92 |
| 7 | −272.077 | (Variable) | | | 29.40 |
| 8 | −355.440 | 1.00 | 1.85026 | 32.3 | 16.42 |
| 9 | 15.895 | 3.19 | | | 14.72 |
| 10 | −22.643 | 1.00 | 1.51633 | 64.1 | 14.69 |
| 11 | 20.214 | 2.59 | 1.80810 | 22.8 | 15.01 |
| 12 | −80.071 | 0.76 | | | 14.97 |
| 13 | −29.267 | 0.84 | 1.72916 | 54.7 | 14.93 |
| 14 | −57.323 | (Variable) | | | 15.03 |
| 15 | 60.994 | 3.23 | 1.73400 | 51.5 | 13.88 |
| 16 | −15.526 | 0.97 | 1.89190 | 37.1 | 13.72 |
| 17 | −41.517 | (Variable) | | | 13.64 |
| 18(Aperture Stop) | ∞ | 11.32 | | | 13.36 |
| 19 | ∞ | 15.00 | | | 12.96 |
| 20 | ∞ | (Variable) | | | 12.42 |
| 21 | 27.859 | 2.49 | 1.53775 | 74.7 | 13.96 |
| 22 | −38.892 | 0.10 | | | 13.98 |
| 23 | 25.863 | 2.81 | 1.43875 | 94.7 | 13.70 |
| 24 | −27.911 | 1.03 | 1.85478 | 24.8 | 13.41 |
| 25 | 771.990 | (Variable) | | | 13.21 |
| 26 | 38.655 | 2.80 | 1.74000 | 28.3 | 12.90 |
| 27 | −19.882 | 0.82 | 1.70154 | 41.2 | 12.60 |
| 28 | 13.777 | 3.68 | | | 11.76 |
| 29 | −20.635 | 0.78 | 1.69680 | 55.5 | 12.06 |
| 30 | −69.361 | (Variable) | | | 12.57 |
| 31 | 40.925 | 0.78 | 1.91650 | 31.6 | 13.71 |
| 32 | 38.915 | 1.54 | 1.79360 | 37.1 | 13.78 |
| 33 | −134.889 | (Variable) | | | 13.87 |
| Image Plane | ∞ | | | | |

Various Data
ZOOM RATIO 2.78

| | WIDE-ANGLE | MIDDLE | TELE-PHOTO |
|---|---|---|---|
| Focal Length: | 28.80 | 41.37 | 80.00 |
| FNO | 3.97 | 3.94 | 4.00 |
| Half Angle of View (degrees) | 16.90 | 11.94 | 6.24 |
| Image Height | 8.75 | 8.75 | 8.75 |
| Overall lens length | 129.86 | 129.86 | 129.85 |
| BF | 26.18 | 25.45 | 27.41 |
| d 7 | 0.20 | 6.54 | 14.11 |
| d14 | 18.94 | 12.70 | 1.27 |
| d17 | 2.12 | 2.02 | 5.87 |
| d20 | 7.59 | 7.34 | 6.24 |
| d25 | 1.09 | 2.14 | 1.28 |
| d30 | 1.47 | 1.39 | 1.39 |
| d33 | 26.18 | 25.45 | 27.41 |
| Entrance Pupil Position | 30.50 | 46.85 | 80.47 |
| Exit Pupil Position | −66.14 | −64.92 | −61.63 |
| Front Principal Point Position | 50.31 | 69.29 | 88.59 |
| Rear Principal Point Position | −2.62 | −15.92 | −52.59 |

Zoom Lens Unit Data

| Lens Unit | Starting Surface | Focal Length | Lens Configuration Length | Front Principal Point Position | Rear Principal Point Position |
|---|---|---|---|---|---|
| L1 | 1 | 41.89 | 15.55 | 8.06 | −3.59 |
| L2 | 8 | −14.75 | 9.37 | 0.96 | −6.02 |
| L3 | 15 | 43.35 | 4.20 | 1.40 | −1.02 |
| LM | 18 | ∞ | 26.32 | 13.16 | −13.16 |
| LRA | 21 | 28.43 | 6.42 | −0.18 | −4.27 |
| LRB | 26 | −18.97 | 8.08 | 4.62 | −1.72 |
| LRC | 31 | 40.00 | 2.33 | 0.25 | −1.03 |

Single Lens Data

| Lens | Starting Surface | Focal Length |
|---|---|---|
| 1 | 1 | −150.36 |
| 2 | 4 | 78.77 |
| 3 | 6 | 56.68 |
| 4 | 8 | −17.87 |
| 5 | 10 | −20.52 |
| 6 | 11 | 20.21 |
| 7 | 13 | −83.05 |
| 8 | 15 | 17.17 |
| 9 | 16 | −28.30 |
| 10 | 21 | 30.58 |
| 11 | 23 | 31.09 |
| 12 | 24 | −31.49 |
| 13 | 26 | 18.11 |
| 14 | 27 | −11.48 |
| 15 | 29 | −42.43 |
| 16 | 31 | −1062.67 |
| 17 | 32 | 38.21 |

Table 1 illustrates the lower and upper limits of inequalities (1) to (12) and numerical values in each example. Since Example 1 does not include the third lens unit L3, the rear A lens unit LRA, and the rear B lens unit LRB, a hyphen (-) is illustrated in inequalities (8) to (12).

TABLE 1

| Inequality | Lower Limit | Upper Limit | Ex. 1 | Ex. 2 | Ex. 3 | Ex. 4 |
|---|---|---|---|---|---|---|
| 1 | 0.05 | 0.50 | 0.31 | 0.36 | 0.14 | 0.38 |
| 2 | −1.60 | −0.50 | −1.38 | −0.85 | −0.94 | −0.96 |
| 3 | 0.25 | 0.49 | 0.35 | 0.41 | 0.43 | 0.31 |
| 4 | 0.50 | 5.00 | 3.24 | 1.36 | 1.45 | 1.45 |
| 5 | −2.00 | −0.10 | −0.86 | −0.43 | −0.51 | −0.51 |
| 6 | 0.50 | 5.00 | 1.14 | 1.69 | 1.88 | 2.03 |
| 7 | 1.00 | 3.00 | 1.48 | 1.28 | 1.11 | 1.33 |
| 8 | 1.00 | 2.00 | — | 1.44 | 1.55 | 1.50 |
| 9 | 0.20 | 1.00 | — | 0.50 | 0.55 | 0.54 |
| 10 | 0.20 | 1.40 | — | 0.90 | 0.61 | 1.20 |
| 11 | 0.20 | 0.80 | — | 0.42 | 0.52 | 0.35 |
| 12 | 0.60 | 3.00 | — | 1.39 | 1.52 | 1.51 |

Figure 13:
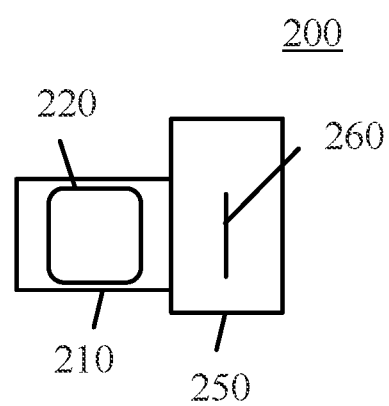
FIG. 13 is a schematic diagram of an image pickup apparatus having an optical system according to each example.

Referring now to FIG. 13, a description will be given of an image pickup apparatus (digital still camera) 200 using the optical system 101 (101a, 101b, 101c) according to each example as an imaging optical system 220. FIG. 13 is a schematic diagram of an image pickup apparatus 200 having the optical system according to each example. The image pickup apparatus 200 includes a camera body 250 having an image sensor 260 and a lens apparatus 210 having an imaging optical system 220 corresponding to the optical system according to any one of Examples 1 to 4. The lens apparatus 210 and the camera body 250 may be integrated with each other, or may be detachable from each other. The reason why only a single optical system is illustrated in FIG. 13 is that two optical systems are arranged side by side in the depth direction. Since the image pickup apparatus 200 includes the lens apparatus 210 as a magnification-varying telephoto lens, stereoscopic imaging is available with a long baseline length with a compact configuration. The optical system according to each example is applicable not only to the digital still camera illustrated in FIG. 13, but also to various image pickup apparatuses such as broadcast cameras, film-based cameras, surveillance cameras, and the like.

Each example can provide a lens apparatus and an image pickup apparatus, each of which has a compact configuration and a long baseline length, and can acquire a stereoscopic image with a natural stereoscopic effect for a distant object. Each example can reduce relative displacement between the two reflective surfaces that bend the optical paths, and improve the image quality.

While the disclosure has been described with reference to exemplary examples, it is to be understood that the disclosure is not limited to the disclosed exemplary examples. The scope of the following claims is to be accorded the broadest interpretation so as to encompass all such modifications and equivalent structures and functions.

This application claims the benefit of Japanese Patent Application No. 2021-187560, filed on Nov. 18, 2021, which is hereby incorporated by reference herein in its entirety.

What is claimed is:

1. A lens apparatus comprising two optical systems, wherein each of the two optical systems includes, in order from an object side to an image side, a first lens unit having positive refractive power, a second lens unit having negative refractive power, a first reflective surface, a second reflective surface, and a rear lens unit having positive refractive power,
wherein at least a distance between the first lens unit and the second lens unit and a distance between the second lens unit and the first reflective surface are changed during magnification variation, and
wherein the following inequality is satisfied:

$0.05 < Dout/Din < 0.50$ $0.50 < f1/fw < 3.57$ where Din is a distance between surface vertices of lenses disposed closest to the object side in each of the two optical systems, Dout is a distance between surface vertices of lenses disposed closest to the image side in each of the two optical systems, f1 is a focal length of the first lens unit, and fw is a focal length at a wide-angle end of the optical system.

2. The lens apparatus according to claim 1, wherein the first reflective surface and the second reflective surface are held by an integrated barrel.

3. The lens apparatus according to claim 1, further comprising an aperture stop between the second lens unit and the first reflective surface.

4. The lens apparatus comprising according to claim 1, wherein each of the two optical systems further comprises a third lens unit having positive refractive power between the second lens unit and the first reflective surface.

5. The lens apparatus according to claim 4, wherein the following inequality is satisfied:

$0.20 < f3/ft < 1.00$ where f3 is a focal length of the third lens unit, and ft is a focal length at a telephoto end of the optical system.

6. The lens apparatus according to claim 4, wherein the following inequality is satisfied:

$0.20 < f3/min(D3R) < 1.40$ where f3 is a focal length of the third lens unit, D3R is a distance along an optical axis between the third lens unit and the rear lens unit, and min (D3R) is a minimum value of D3R during magnification variation.

7. The lens apparatus according to claim 4, wherein the following inequality is satisfied:

$0.20 < min(D3R)/Max(Dtotal) < 0.80$ where D3R is a distance along an optical axis between the third lens unit and the rear lens unit, min (D3R) is a minimum value of D3R during magnification variation, Dtotal is a distance along the optical axis between an optical surface closest to the object and an optical surface closest to an image plane, and Max (Dtotal) is a maximum value of Dtotal during the magnification variation.

8. The lens apparatus according to claim 4, wherein the following inequality is satisfied:

$0.60 < f3/fw < 3.00$ where f3 is a focal length of the third lens unit.

9. The lens apparatus according to claim 4, wherein the third lens unit includes one lens having positive refractive power, and one lens having negative refractive power.

10. The lens apparatus according to claim 1, wherein the first reflective surface and the second reflective surface are reflective surfaces in an integrally molded optical element.

11. The lens apparatus according to claim 1, wherein the following inequality is satisfied:

$-1.60 < f12w/fw < -0.50$ where f12w is a combined focal length at wide-angle ends of the first lens unit and the second lens unit.

12. The lens apparatus according to claim 1, wherein the following inequality is satisfied:

$0.25 < DRR/Din < 0.47$ where DRR is a distance along an optical axis from the first reflective surface to the second reflective surface.

13. The lens apparatus according to claim 1, wherein the following inequality is satisfied:

$-2.00 < f2/fw < -0.10$ where f2 is a focal length of the second lens unit.

14. The lens apparatus according to claim 1, wherein the following inequality is satisfied:

$0.50 < fR/fw < 5.00$ where fR is a focal length of the rear lens unit.

15. The lens apparatus according to claim 1, wherein the following inequality is satisfied:

$1.00 < Dout/\Phi out < 3.00$ where $\Phi out$ is an effective diameter of a lens disposed closest to the image side of the optical system.

16. The lens apparatus according to claim 1, wherein the rear lens unit is not moved during the magnification variation.

17. The lens apparatus according to claim 1, wherein the first lens unit includes one meniscus lens having negative refractive power and a convex surface facing an object, and two lenses each having positive refractive power.

18. The lens apparatus according to claim 1, wherein the second lens unit includes two lenses each having negative refractive power, and one lens having positive refractive power.

19. The lens apparatus according to claim 1, wherein the rear lens unit includes a rear B lens unit movable in a direction orthogonal to an optical axis for image stabilization, and
wherein in a case where a rear A lens unit is a lens on the object side of the rear B lens unit in the rear lens unit, and a rear C lens unit is a lens on the image side of the rear B lens unit in the rear lens unit, the rear lens unit includes at least one of the rear A lens unit and the rear C lens unit.

20. The lens apparatus according to claim 19, wherein the following inequality is satisfied:

$$1.00<|fRA/fRB|<2.00$$

where fRA is a focal length of the rear A lens unit, and fRB is a focal length of the rear B lens unit.

21. The lens apparatus according to claim 1, wherein the following inequality is satisfied:

$$20<\alpha<50$$

where α (°) is an incident angle of an on-axis principal ray on the first reflective surface and the second reflective surface.

22. The lens apparatus according to claim 1, further comprising a field stop on at least one of the object side of the first lens unit and the image side of the rear lens unit.

23. An image pickup apparatus comprising:
a lens apparatus; and
an image sensor configured to capture an optical image formed by the lens apparatus;
wherein the lens apparatus includes two optical systems,
wherein each of the two optical systems includes, in order from an object side to an image side, a first lens unit having positive refractive power, a second lens unit having negative refractive power, a first reflective surface, a second reflective surface, and a rear lens unit having positive refractive power,
wherein at least a distance between the first lens unit and the second lens unit and a distance between the second lens unit and the first reflective surface are changed during magnification variation, and
wherein the following inequality is satisfied:

$$0.05<Dout/Din<0.50$$

$$0.50<f1/fw<3.57$$

where Din is a distance between surface vertices of lenses disposed closest to the object side in each of the two optical systems, and Dout is a distance between surface vertices of lenses disposed closest to the image side in each of the two optical systems, f1 is a focal length of the first lens unit, and fw is a focal length at a wide-angle end of the optical system.

* * * * *